United States Patent
Tang et al.

(10) Patent No.: US 8,294,997 B2
(45) Date of Patent: Oct. 23, 2012

(54) OPTICAL IMAGING LENS ASSEMBLY

(75) Inventors: Hsiang Chi Tang, Taichung (TW); Chun Shan Chen, Taichung (TW); Hsin Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 226 days.

(21) Appl. No.: 12/874,741

(22) Filed: Sep. 2, 2010

(65) Prior Publication Data

US 2012/0013998 A1   Jan. 19, 2012

(30) Foreign Application Priority Data

Jul. 16, 2010   (TW) .............................. 99123421 A

(51) Int. Cl.
*G02B 9/34* (2006.01)
(52) U.S. Cl. ....................................................... 359/773
(58) Field of Classification Search .................. 359/773, 359/715

See application file for complete search history.

(56) References Cited

U.S. PATENT DOCUMENTS

| | | | |
|---|---|---|---|
| 7,365,920 B2 | 4/2008 | Noda | |
| 2010/0103533 A1* | 4/2010 | Taniyama | 359/715 |

* cited by examiner

*Primary Examiner* — Alicia M Harrington
(74) *Attorney, Agent, or Firm* — Morris Manning & Martin LLP; Tim Tingkang Xia, Esq.

(57) ABSTRACT

This invention provides an optical imaging lens assembly, in order from an object side toward an image side including: a first lens element with positive refractive power having a convex object-side surface, a second lens element with negative refractive power having a concave object-side surface and a concave image-side surface, a third lens element with positive refractive power having a concave object-side surface and a convex image-side surface, a fourth lens element with negative refractive power having a concave image-side surface, and the two surfaces being aspheric; wherein the optical imaging lens assembly further comprises an aperture stop disposed between an imaged object and the first lens element, and there are four lens elements with refractive power.

25 Claims, 26 Drawing Sheets

| TABLE 1 | | | | | | | |
|---|---|---|---|---|---|---|---|
| (Embodiment 1) | | | | | | | |
| f = 3.34 mm, Fno = 2.81, HFOV = 34.0 deg. | | | | | | | |
| Surface # | | Curvature Radius | Thickness | Material | Index | Abbe # | Focal length |
| 0 | Object | Plano | Infinity | | | | |
| 1 | Stop | Plano | -0.180 | | | | |
| 2 | Lens 1 | 1.10236 (ASP) | 0.561 | Plastic | 1.543 | 56.5 | 2.27 |
| 3 | | 8.43060 (ASP) | 0.128 | | | | |
| 4 | Lens 2 | -50.00000 (ASP) | 0.310 | Plastic | 1.632 | 23.4 | -4.21 |
| 5 | | 2.81585 (ASP) | 0.409 | | | | |
| 6 | Lens 3 | -1.68149 (ASP) | 0.684 | Plastic | 1.543 | 56.5 | 2.48 |
| 7 | | -0.85516 (ASP) | 0.050 | | | | |
| 8 | Lens 4 | 6.76530 (ASP) | 0.525 | Plastic | 1.530 | 55.8 | -2.46 |
| 9 | | 1.06437 (ASP) | 0.200 | | | | |
| 10 | IR-filter | Plano | 0.300 | Glass | 1.517 | 64.2 | - |
| 11 | | Plano | 0.200 | | | | |
| 12 | Cover-glass | Plano | 0.400 | Glass | 1.517 | 64.2 | - |
| 13 | | Plano | 0.268 | | | | |
| 14 | Image | Plano | - | | | | |
| Note: Reference wavelength is d-line(587.6nm) | | | | | | | |

Fig. 7

| TABLE 2 | | | | |
|---|---|---|---|---|
| Aspheric Coefficients | | | | |
| Surface # | 2 | 3 | 4 | 5 |
| k = | -7.42097E-02 | 5.91121E+01 | -2.00000E+02 | 2.72841E+00 |
| A4 = | 4.36570E-02 | 4.48419E-02 | 9.11479E-02 | 2.04629E-01 |
| A6 = | -7.96190E-02 | -5.19874E-01 | -1.06567E+00 | -2.70956E-01 |
| A8 = | 4.09824E-01 | 1.40738E+00 | 1.61089E+00 | 1.81082E-01 |
| A10= | -5.28668E-01 | -3.94999E+00 | -1.48359E+00 | 1.97497E-01 |
| A12= | | 8.05883E-01 | -5.38754E+00 | |
| Surface # | 6 | 7 | 8 | 9 |
| k = | -9.39386E-01 | -1.68612E+00 | -8.84235E+02 | -8.61061E+00 |
| A4 = | 5.14498E-02 | 8.05537E-02 | -1.07735E-01 | -1.27381E-01 |
| A6 = | 8.37225E-02 | -7.01404E-03 | 3.62659E-02 | 3.91656E-02 |
| A8 = | -3.34074E-01 | -5.03243E-02 | -1.40265E-04 | -9.69899E-03 |
| A10= | -2.27010E-01 | -3.69527E-02 | 3.77427E-05 | 6.34494E-04 |
| A12= | 4.83109E-01 | 5.19442E-02 | -4.28707E-04 | 8.06036E-05 |
| A14= | 8.30877E-01 | 3.78915E-02 | -1.26557E-05 | -3.88685E-06 |
| A16= | -1.26623E+00 | -3.26736E-02 | 1.84618E-05 | -5.45623E-07 |

Fig. 8

| TABLE 3 | | | | | | |
|---|---|---|---|---|---|---|
| (Embodiment 2) | | | | | | |
| f = 3.05 mm, Fno = 2.45, HFOV = 37.0 deg. | | | | | | |
| Surface # | | Curvature Radius | Thickness | Material | Index | Abbe # | Focal length |
| 0 | Object | Plano | Infinity | | | | |
| 1 | Stop | Plano | -0.140 | | | | |
| 2 | Lens 1 | 1.29491 (ASP) | 0.476 | Plastic | 1.544 | 55.9 | 2.01 |
| 3 | | -6.19150 (ASP) | 0.050 | | | | |
| 4 | Lens 2 | -8.77740 (ASP) | 0.280 | Plastic | 1.632 | 23.4 | -3.63 |
| 5 | | 3.14620 (ASP) | 0.476 | | | | |
| 6 | Lens 3 | -1.45909 (ASP) | 0.492 | Plastic | 1.544 | 55.9 | 1.79 |
| 7 | | -0.65360 (ASP) | 0.050 | | | | |
| 8 | Lens 4 | -100.00000 (ASP) | 0.496 | Plastic | 1.544 | 55.9 | -1.77 |
| 9 | | 0.97564 (ASP) | 0.200 | | | | |
| 10 | IR-filter | Plano | 0.300 | Glass | 1.517 | 64.2 | - |
| 11 | | Plano | 0.860 | | | | |
| 12 | Image | Plano | - | | | | |
| Note: Reference wavelength is d-line(587.6nm) | | | | | | | |
| Note: On Surface #9, the effective diameter of the aperture is 3.3mm | | | | | | | |

Fig. 9

| TABLE 4 | | | | |
|---|---|---|---|---|
| Aspheric Coefficients | | | | |
| Surface # | 2 | 3 | 4 | 5 |
| k    = | -9.98910E+00 | -1.70995E+01 | 0.00000E+00 | -8.03485E-01 |
| A4 = | 5.06331E-01 | 1.19530E-01 | 3.40448E-01 | 2.35129E-01 |
| A6 = | -1.13294E+00 | -9.99322E-01 | -1.50280E+00 | 3.20923E-01 |
| A8 = | 2.24771E+00 | 1.41842E+00 | 5.07916E+00 | -2.44072E+00 |
| A10= | -3.55705E+00 | 1.41738E+00 | -1.43786E+01 | 4.11263E+00 |
| A12= | 2.28795E+00 | -6.89615E+00 | 2.96974E+01 | 1.80586E+00 |
| A14= | -1.61595E+00 | 4.26966E+00 | -2.54440E+01 | -5.34537E+00 |
| Surface # | 6 | 7 | 8 | 9 |
| k    = | -1.02633E+00 | -3.31500E+00 | -1.00000E+00 | -1.00307E+01 |
| A4 = | -7.05427E-02 | -3.69802E-01 | -1.32430E-01 | -1.70145E-01 |
| A6 = | 9.71483E-01 | 7.02029E-01 | -9.71620E-03 | 9.62263E-02 |
| A8 = | -4.23586E+00 | -9.68661E-01 | 5.67757E-02 | -5.28710E-02 |
| A10= | 9.64052E+00 | 8.12564E-01 | -2.33940E-02 | 1.82218E-02 |
| A12= | -1.16565E+01 | -7.25191E-02 | 7.90021E-03 | -3.81179E-03 |
| A14= | 5.66161E+00 | -1.32842E-01 | -2.03983E-03 | 3.67527E-04 |

Fig. 10

| TABLE 5 | | | | | | | |
|---|---|---|---|---|---|---|---|
| (Embodiment 3) | | | | | | | |
| f = 5.40 mm, Fno = 2.85, HFOV= 33.5 deg. | | | | | | | |
| Surface # | | Curvature Radius | Thickness | Material | Index | Abbe # | Focal length |
| 0 | Object | Plano | Infinity | | | | |
| 1 | Stop | Plano | -0.230 | | | | |
| 2 | Lens 1 | 1.87773 (ASP) | 0.654 | Plastic | 1.544 | 55.9 | 3.39 |
| 3 | | -100.00000 (ASP) | 0.094 | | | | |
| 4 | Lens 2 | -50.00000 (ASP) | 0.495 | Plastic | 1.632 | 23.4 | -5.85 |
| 5 | | 4.00610 (ASP) | 1.141 | | | | |
| 6 | Lens 3 | -2.88848 (ASP) | 0.949 | Plastic | 1.544 | 55.9 | 2.84 |
| 7 | | -1.12281 (ASP) | 0.391 | | | | |
| 8 | Lens 4 | -8.22070 (ASP) | 0.360 | Plastic | 1.544 | 55.9 | -2.71 |
| 9 | | 1.82868(ASP) | 0.450 | | | | |
| 10 | IR-filter | Plano | 0.300 | Glass | 1.517 | 64.2 | - |
| 11 | | Plano | 1.234 | | | | |
| 12 | Image | Plano | - | | | | |
| Note: Reference wavelength is d-line(587.6nm) | | | | | | | |

Fig. 11

| TABLE 6A | | | | |
|---|---|---|---|---|
| Aspheric Coefficients | | | | |
| Surface # | 2 | 3 | 4 | 5 |
| k = | 1.85583E-01 | -9.00000E+01 | -7.24434E+01 | 1.00059E+01 |
| A4 = | -2.70887E-03 | -1.12742E-02 | 3.37677E-03 | 1.94655E-02 |
| A6 = | -1.12441E-02 | -1.95126E-02 | -9.84306E-03 | -3.13289E-03 |
| A8 = | 1.10193E-02 | 9.86189E-03 | 6.62077E-03 | 3.51819E-03 |
| A10= | -1.18657E-02 | -4.97668E-03 | 8.61420E-04 | |
| A12= | | | 3.21302E-03 | |
| Surface # | 6 | 7 | 8 | |
| k = | 1.67790E-01 | -3.72902E+00 | -7.02307E+01 | |
| A4 = | -4.21695E-02 | -1.12842E-01 | -3.62763E-02 | |
| A6 = | -2.69558E-02 | 5.24622E-02 | 8.99495E-03 | |
| A8 = | 5.55387E-02 | -1.85674E-02 | -5.62689E-04 | |
| A10= | -6.87727E-02 | -6.77071E-04 | -2.49555E-05 | |
| A12= | 3.46214E-02 | 1.81140E-03 | -1.16886E-05 | |
| A14= | -3.78194E-03 | 2.02727E-05 | 3.26452E-06 | |
| A16= | -1.42581E-03 | -8.88558E-05 | -1.88596E-07 | |

Fig. 12A

| TABLE 6B | |
|---|---|
| Aspheric Coefficients | |
| Surface # | 9 |
| k = | -1.09913E+01 |
| A1 = | |
| A2 = | |
| A3 = | |
| A4 = | -4.46112E-02 |
| A5 = | |
| A6 = | 1.10795E-02 |
| A7 = | |
| A8 = | -2.06770E-03 |
| A9 = | |
| A10= | 2.10691E-04 |
| A11= | |
| A12= | -4.66462E-06 |
| A13= | |
| A14= | -1.16207E-06 |
| A15= | |
| A16= | 8.26000E-08 |

Fig. 12B

| TABLE 7 | | | | | | |
|---|---|---|---|---|---|---|
| (Embodiment 4) | | | | | | |
| f = 4.40 mm, Fno = 2.83, HFOV = 33.0 deg. | | | | | | |
| Surface # | | Curvature Radius | Thickness | Material | Index | Abbe # | Focal length |
| 0 | Object | Plano | Infinity | | | | |
| 1 | Stop | Plano | -0.061 | | | | |
| 2 | Lens 1 | 2.3905 | 1.142 | Glass | 1.729 | 54.7 | 3.45 |
| 3 | | 38.7608 | 0.141 | | | | |
| 4 | Lens 2 | -47.61320 (ASP) | 0.300 | Plastic | 1.632 | 23.4 | -5.44 |
| 5 | | 3.71460 (ASP) | 0.477 | | | | |
| 6 | Lens 3 | -7.25800 (ASP) | 1.218 | Plastic | 1.544 | 55.9 | 2.30 |
| 7 | | -1.12948 (ASP) | 0.255 | | | | |
| 8 | Lens 4 | -14.80400 (ASP) | 0.425 | Plastic | 1.544 | 55.9 | -2.42 |
| 9 | | 1.45844 (ASP) | 0.300 | | | | |
| 10 | IR-filter | Plano | 0.300 | Glass | 1.517 | 64.2 | - |
| 11 | | Plano | 0.500 | | | | |
| 12 | Cover-glass | Plano | 0.400 | Glass | 1.517 | 64.2 | - |
| 13 | | Plano | 0.251 | | | | |
| 14 | Image | Plano | - | | | | |
| Note: Reference wavelength is d-line(587.6nm) | | | | | | |

Fig. 13

| TABLE 8 | | | | |
|---|---|---|---|---|
| Aspheric Coefficients | | | | |
| Surface # | 4 | 5 | 6 | 7 |
| k = | 0.00000E+00 | 2.93183E+00 | -1.15456E-16 | -3.66008E+00 |
| A4 = | 2.00282E-02 | 4.40168E-02 | 1.76536E-02 | -3.22449E-02 |
| A6 = | -7.77428E-02 | -4.51172E-02 | 5.40035E-03 | 1.08201E-02 |
| A8 = | 1.02121E-01 | 2.18011E-02 | -7.27665E-04 | 1.42336E-03 |
| A10= | -5.17726E-02 | 1.05815E-02 | -1.23808E-04 | 8.27923E-04 |
| A12= | 1.09295E-02 | -6.96024E-03 | | 3.04035E-04 |
| A14= | -2.16004E-03 | | | -1.82699E-04 |
| Surface # | 8 | 9 | | |
| k = | -1.90556E+01 | -9.27107E+00 | | |
| A4 = | -4.29143E-02 | -5.18389E-02 | | |
| A6 = | 5.42445E-03 | 1.11128E-02 | | |
| A8 = | 1.07772E-03 | -2.09961E-03 | | |
| A10= | -6.55734E-05 | 1.81857E-04 | | |
| A12= | -1.67409E-05 | -3.91670E-06 | | |

Fig. 14

| TABLE 9 | | | | | | |
|---|---|---|---|---|---|---|
| (Embodiment 5) | | | | | | |
| f = 4.41 mm, Fno = 2.83, HFOV = 33.0 deg. | | | | | | |
| Surface # | | Curvature Radius | Thickness | Material | Index | Abbe # | Focal length |
| 0 | Object | Plano | Infinity | | | | |
| 1 | Stop | Plano | -0.100 | | | | |
| 2 | Lens 1 | 2.4022 | 1.130 | Glass | 1.729 | 54.7 | 3.45 |
| 3 | | 42.9755 | 0.164 | | | | |
| 4 | Lens 2 | -6.03620 (ASP) | 0.366 | Plastic | 1.632 | 23.4 | -5.90 |
| 5 | | 9.98120 (ASP) | 0.558 | | | | |
| 6 | Lens 3 | -2.70134 (ASP) | 0.768 | Plastic | 1.544 | 55.9 | 2.58 |
| 7 | | -1.01556 (ASP) | 0.121 | | | | |
| 8 | Lens 4 | -50.00000 (ASP) | 0.771 | Plastic | 1.544 | 55.9 | -2.82 |
| 9 | | 1.59365 (ASP) | 0.300 | | | | |
| 10 | IR-filter | Plano | 0.300 | Glass | 1.517 | 64.2 | - |
| 11 | | Plano | 0.500 | | | | |
| 12 | Cover-glass | Plano | 0.400 | Glass | 1.517 | 64.2 | - |
| 13 | | Plano | 0.368 | | | | |
| 14 | Image | Plano | - | | | | |
| Note: Reference wavelength is d-line(587.6nm) | | | | | | |

Fig. 15

| TABLE 10 | | | | |
|---|---|---|---|---|
| Aspheric Coefficients | | | | |
| Surface # | 4 | 5 | 6 | 7 |
| k = | 0.00000E+00 | 2.11759E+01 | -1.83706E+00 | -2.84599E+00 |
| A4 = | 7.95851E-02 | 1.20862E-01 | 5.01500E-03 | -8.00283E-02 |
| A6 = | -1.32604E-01 | -8.66578E-02 | 3.61709E-02 | 4.31141E-02 |
| A8 = | 1.58459E-01 | 4.93418E-02 | -1.24513E-02 | -4.22785E-03 |
| A10= | -1.12946E-01 | -1.18111E-02 | 2.90785E-03 | 6.74635E-04 |
| A12= | 4.43552E-02 | 8.50053E-04 | | 8.16168E-04 |
| A14= | -7.52762E-03 | | | -2.40463E-04 |
| Surface # | 8 | 9 | | |
| k = | 4.35135E-11 | -9.96429E+00 | | |
| A4 = | -3.57309E-02 | -4.76403E-02 | | |
| A6 = | 1.51913E-02 | 1.26761E-02 | | |
| A8 = | -4.30577E-03 | -3.00655E-03 | | |
| A10= | 5.09827E-04 | 3.68635E-04 | | |
| A12= | -1.31673E-05 | -2.12731E-05 | | |

Fig. 16

| TABLE 11 | | | | | | | |
|---|---|---|---|---|---|---|---|
| (Embodiment 6) | | | | | | | |
| f = 3.42 mm, Fno = 2.83, HFOV = 33.7 deg. | | | | | | | |
| Surface # | | Curvature Radius | Thickness | Material | Index | Abbe # | Focal length |
| 0 | Object | Plano | Infinity | | | | |
| 1 | Stop | Plano | -0.150 | | | | |
| 2 | Lens 1 | 1.20602 (ASP) | 0.531 | Plastic | 1.543 | 56.5 | 2.20 |
| 3 | | -106.47020 (ASP) | 0.100 | | | | |
| 4 | Lens 2 | -24.58510 (ASP) | 0.300 | Plastic | 1.632 | 23.4 | -3.71 |
| 5 | | 2.60620 (ASP) | 0.486 | | | | |
| 6 | Lens 3 | -1.95000 (ASP) | 0.659 | Plastic | 1.543 | 56.5 | 2.73 |
| 7 | | -0.94280 (ASP) | 0.278 | | | | |
| 8 | Lens 4 | 5.48390 (ASP) | 0.356 | Plastic | 1.530 | 55.8 | -2.64 |
| 9 | | 1.09059 (ASP) | 0.254 | | | | |
| 10 | IR-filter | Plano | 0.300 | Glass | 1.517 | 64.2 | - |
| 11 | | Plano | 0.200 | | | | |
| 12 | Cover-glass | Plano | 0.400 | Glass | 1.517 | 64.2 | - |
| 13 | | Plano | 0.214 | | | | |
| 14 | Image | Plano | - | | | | |
| Note: Reference wavelength is d-line(587.6nm) | | | | | | | |

Fig. 17

| TABLE 12 | | | | |
|---|---|---|---|---|
| Aspheric Coefficients | | | | |
| Surface # | 2 | 3 | 4 | 5 |
| k   = | -1.41912E-01 | 2.00000E+02 | -2.00000E+02 | 1.09809E+00 |
| A4 = | 3.19749E-02 | 1.05696E-01 | 1.49066E-01 | 1.90654E-01 |
| A6 = | -5.06877E-02 | -6.45346E-01 | -8.54815E-01 | -2.81907E-01 |
| A8 = | 2.68454E-01 | 1.55114E+00 | 1.34115E+00 | 2.91619E-01 |
| A10= | -4.60519E-01 | -3.07039E+00 | -1.44556E+00 | 1.34783E-01 |
| A12= |  | 1.16170E+00 | -6.93503E-01 |  |
| Surface # | 6 | 7 | 8 | 9 |
| k   = | 1.09328E+00 | -1.95834E+00 | -8.25833E+02 | -8.61061E+00 |
| A4 = | -1.13382E-05 | 3.78397E-03 | -1.38687E-01 | -1.27381E-01 |
| A6 = | 5.23004E-02 | -3.28332E-02 | 4.12583E-02 | 3.91656E-02 |
| A8 = | -3.26755E-01 | -3.12586E-02 | -4.97235E-05 | -9.69899E-03 |
| A10= | -1.75308E-01 | -3.32047E-02 | -8.80502E-05 | 6.34494E-04 |
| A12= | 4.93534E-01 | 5.33653E-02 | -4.27381E-04 | 8.06036E-05 |
| A14= | 7.98690E-01 | 3.83894E-02 | 1.31450E-06 | -3.88685E-06 |
| A16= | -1.36038E+00 | -3.37128E-02 | 1.75536E-05 | -5.45623E-07 |

Fig. 18

| TABLE 13 | | | | | | |
|---|---|---|---|---|---|---|
| | Embodiment 1 | Embodiment 2 | Embodiment 3 | Embodiment 4 | Embodiment 5 | Embodiment 6 |
| f | 3.34 | 3.05 | 5.40 | 4.40 | 4.41 | 3.42 |
| Fno | 2.81 | 2.45 | 2.85 | 2.83 | 2.83 | 2.83 |
| HFOV | 34.0 | 37.0 | 33.5 | 33.0 | 33.0 | 33.7 |
| V1-V2 | 33.1 | 32.5 | 32.5 | 31.3 | 31.3 | 33.1 |
| (T12/f)*100 | 3.83 | 1.64 | 1.74 | 3.20 | 3.72 | 2.92 |
| Dr1r4/CT3 | 1.46 | 1.64 | 1.31 | 1.30 | 2.16 | 1.41 |
| R1/f | 0.33 | 0.42 | 0.35 | 0.54 | 0.54 | 0.35 |
| \|R1/R2\| | 0.13 | 0.21 | 0.02 | 0.06 | 0.06 | 0.01 |
| (R5+R6)/(R5-R6) | 3.07 | 2.62 | 2.27 | 1.37 | 2.20 | 2.87 |
| R3/f | -14.97 | -2.88 | -9.26 | -10.82 | -1.37 | -7.19 |
| R5/f | -0.50 | -0.48 | -0.53 | -1.65 | -0.61 | -0.57 |
| \|R7/f\| | 2.03 | 32.79 | 1.52 | 3.36 | 11.34 | 1.60 |
| f3/f | 0.74 | 0.59 | 0.53 | 0.52 | 0.58 | 0.80 |
| f4/f | -0.74 | -0.58 | -0.50 | -0.55 | -0.64 | -0.77 |
| \|f3/f4\| | 1.01 | 1.01 | 1.05 | 0.95 | 0.91 | 1.03 |
| SL/TTL | 0.95 | 0.96 | 0.96 | 0.99 | 0.98 | 0.96 |
| TTL/ImgH | 1.68 | 1.57 | 1.67 | 1.93 | 1.94 | 1.70 |

Fig. 19

OPTICAL IMAGING LENS ASSEMBLY

CROSS-REFERENCE TO RELATED APPLICATIONS

This non-provisional application claims priority under 35 U.S.C. §119(a) on Patent Application No(s). 099118872 filed in Taiwan, R.O.C. on Jun. 10, 2010, the entire contents of which are hereby incorporated by reference.

BACKGROUND OF THE INVENTION

1. Field of the Invention

The present invention relates to an optical imaging lens assembly, and more particularly, to a compact optical imaging lens assembly used in portable electronic devices.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and the resolution of compact imaging lenses has gradually increased, there is an increasing demand for compact imaging lenses featuring better image quality.

A conventional high resolution compact optical imaging lens assembly, such as the one disclosed in U.S. Pat. No. 7,365,920, generally comprises four lens elements, wherein two spherical-surface glass lenses are used as the first and second lens elements, and being adhered together to form a doublet and thereby to correct the chromatic aberration. Such an arrangement of optical elements, however, has the following disadvantages: (1) the freedom of the system is curtailed due to the employment of excess number of spherical-surface glass lenses, thus the total track length of the system cannot be reduced easily; (2) the process of making the glass lenses adhered together is complicated, posing difficulties in manufacturing.

Therefore, a need exists in the art for an optical imaging lens assembly that features better image quality, maintains a small total track length and is easy to manufacture.

SUMMARY OF THE INVENTION

The present invention provides an optical imaging lens assembly comprising: in order from an object side to an image side: a first lens element with positive refractive power having a convex object-side surface; a second lens element with negative refractive power having a concave object-side surface and a concave image-side surface; a third lens element with positive refractive power having a concave object-side surface and a convex image-side surface; and a fourth lens element with negative refractive power having a concave image-side surface, the object-side and image-side surfaces thereof being aspheric; wherein the optical imaging lens assembly further comprises an aperture stop and an electronic sensor for image formation, wherein the aperture stop is disposed between the imaged object and the first lens element, the electronic sensor is disposed at the image plane; wherein there are four lens elements with refractive power in the optical imaging lens assembly; and wherein the focal length of the optical imaging lens assembly is f, the focal length of the third lens element is f3, the focal length of the fourth element is f4, the radius of curvature on the object-side surface of the first lens element is R1, the radius of curvature on the object-side surface of the third lens element is R5, the distance on the optical axis between the object-side surface of the first lens element and the image-side surface of the second lens element is Dr1r4, the thickness on the optical axis of the third lens element is CT3, the distance on the optical axis between the aperture stop and the electronic sensor is SL (including the air conversion distance between the image-side surface of the fourth lens element and the electronic sensor), the distance on the optical axis between the object-side surface of the first lens element and the electronic sensor is TTL (including the air conversion distance between the image-side surface of the fourth lens element and the electronic sensor), and they satisfy the relations:

$-0.60 < R5/f < -0.20;$ $0.35 < f3/f < 0.91;$ $-0.83 < f4/f < -0.40;$ $1.00 < Dr1r4/CT3 < 1.75;$ $0.20 < R1/f < 0.41;$ $0.9 < SL/TTL < 1.1$

According to another aspect of the present invention, an optical imaging lens assembly comprises, in order from an object side to an image side: a first lens element with positive refractive power having a convex object-side surface; a second lens element with negative refractive power having a concave object-side surface and a concave image-side surface; a third lens element with positive refractive power having a concave object-side surface and a convex image-side surface; a fourth lens element with negative refractive power having a concave image-side surface, the object-side and image-side surfaces thereof being aspheric; wherein there are four lens elements with refractive power in the optical imaging lens assembly; wherein the focal length of the optical imaging lens assembly is f, the focal length of the third lens element is f3, the focal length of the fourth lens element is f4, the radius of curvature on the object-side surface of the second lens element is R3, the radius of curvature on the object-side surface of the third lens element is R5, the radius of curvature on the image-side surface of the third lens element is R6, the distance on the optical axis between the first and the second lens elements is T12, and they satisfy the relation:

$-18.0 < R3/f < -2.5;$ $0.35 < f3/f < 0.91;$ $-0.83 < f4/f < -0.40;$ $2.25 < (R5+R6)/(R5-R6) < 5.00;$ $0.5 < (T12/f)*100 < 4.0$

According to another aspect of the present invention, an optical imaging lens assembly comprises, in order from an object side to an image side: a first lens element with positive refractive power having a convex object-side surface; a second lens element with negative refractive power having a concave object-side surface and a concave image-side surface; a third lens element with positive refractive power having a concave object-side surface and a convex image-side surface, at least one of the object-side and image-side surfaces having at least one inflection point; a fourth lens element with negative refractive power having a concave image-side surface, at least one inflection point formed on the image-side surface; wherein the optical imaging lens assembly further comprises an aperture stop and an electronic sensor for image formation; wherein the aperture stop is disposed between the imaged object and the first lens element, the electronic sensor is disposed at the image plane, and there are four lens elements with refractive power in the optical imaging lens assembly; wherein the focal length of the optical imaging lens assembly is f, the focal length of the third lens element is f3, the focal length of the fourth lens element is f4, the radius of curvature on the object-side surface of the first lens element is R1, the radius of curvature on the image-side surface of the first lens element is R2, the radius of curvature on the object-side surface of the fourth lens element is R7, the distance on the optical axis between the aperture stop and the electronic sensor is SL (including the air conversion distance between the image-side surface of the fourth lens element and the electronic sensor), the distance on the optical axis between the object-side surface of the first lens element and the electronic sensor is TTL (including the air conversion distance between the image-side surface of the fourth lens element and the electronic sensor), and they satisfy the relations:

$|R1/R2|<0.15;$ $0.35<f3/f<0.91;$ $-0.83<f4/f<-0.40;$ $|R7/f|>3.0;$ $0.9<SL/TTL<1.1$

Such an arrangement of optical elements can reduce the size of the optical system and obtain higher resolution.

In the present optical imaging lens assembly, the first lens element has positive refractive power supplying a portion of total refractive power needed in the system, which reduces the total track length of the optical imaging lens assembly; the second lens element has negative refractive power so that the aberration generated from the positive refractive power of the first lens element and the chromatic aberration of the system can be favorably corrected; the third lens element has positive refractive power, which effectively distributes the refractive power of the first lens element and reduces the sensitivity of the system; the fourth lens element having negative refractive power can make the principal point of the optical imaging lens assembly further away from the image plane, which effectively reduces the total track length of the optical imaging lens assembly and maintains the compactness of the lens assembly.

In the present optical imaging lens assembly, the aperture stop can be disposed between the imaged object and the first lens element, or the first lens element and the second lens element. The first and the third lens elements provide positive refractive power, and the aperture stop is disposed near the object side of the optical imaging lens assembly, thereby the total track length of the optical imaging lens assembly can be reduced effectively. The aforementioned arrangement also enables the exit pupil of the optical imaging lens assembly to be positioned far away from the image plane, thus light will be projected onto the electronic sensor at a nearly perpendicular angle, and this is the telecentric feature of the image side. The telecentric feature is very important to the photosensitivity of the solid-state sensor as it can improve the photosensitivity of the sensor and reduce the probability of the shading occurrence. Moreover, the third or the fourth lens element is provided with at least one inflection point, thereby the angle at which the light is projected onto the sensor from the off-axis field can be effectively reduced to further correct the off-axis aberrations. In addition, when the aperture stop is disposed closer to the second lens elements, distortion and the chromatic aberration of magnification can be corrected, which achieves a favorable balance between reducing the total track length of the lens assembly and the system sensitivity. Therefore, in the present optical imaging lens assembly, the aperture stop is placed between the imaged object and the second lens element for the purpose of achieving a balance between the telecentric feature and reducing sensitivity of the optical imaging lens assembly; preferably, the aperture stop is disposed between the imaged object and the first lens element, which can enhance the telecentric feature of the system while further reducing the total track length of the entire optical imaging lens assembly.

In the present optical imaging lens assembly, when the first lens element is a bi-convex lens element, the refractive power thereof can be effectively enhanced, thus shortening the total track length of the optical imaging lens assembly. When the first lens element has a convex object-side surface and a concave image-side surface, the astigmatism of the system can be corrected more favorably while increasing the image quality of the system. When the second lens element has a concave object-side surface and a concave image-side surface, the Petzval Sum of the system can be effectively corrected and the back focal length of the system can be increased, thereby providing sufficient space to accommodate other components. When the third lens element has a concave object-side surface and a convex image-side surface, astigmatism of the system can be corrected. When the fourth lens element has a concave object-side surface and a concave image-side surface, it allows the principal point of the optical system to be further away from the image plane, which can favorably reduce the total optical track length of the system in order to stay compact. When the fourth lens element has a convex object-side surface and a concave image-side surface, it can favorably correct the astigmatism and high order aberration of the system.

BRIEF DESCRIPTION OF THE DRAWINGS

FIG. 7 is TABLE 1 which lists the optical data of the first embodiment.

FIG. 8 is TABLE 2 which lists the aspheric surface data of the first embodiment.

FIG. 9 is TABLE 3 which lists the optical data of the second embodiment.

FIG. 10 is TABLE 4 which lists the aspheric surface data of the second embodiment.

FIG. 11 is TABLE 5 which lists the optical data of the third embodiment.

FIG. 12 is TABLE 6 which lists the aspheric surface data of the third embodiment.

FIG. 13 is TABLE 7 which lists the optical data of the fourth embodiment.

FIG. 14 is TABLE 8 which lists the aspheric surface data of the fourth embodiment.

FIG. 15 is TABLE 9 which lists the optical data of the fifth embodiment.

FIG. 16 is TABLE 10 which lists the aspheric surface data of the fifth embodiment.

FIG. 17 is TABLE 11 which lists the optical data of the sixth embodiment.

FIG. 18 is TABLE 12 which lists the aspheric surface data of the sixth embodiment.

FIG. 19 is TABLE 13 which lists the data of the respective embodiments resulting from the equations.

DETAILED DESCRIPTION OF THE PREFERRED EMBODIMENTS

Figure 1A:
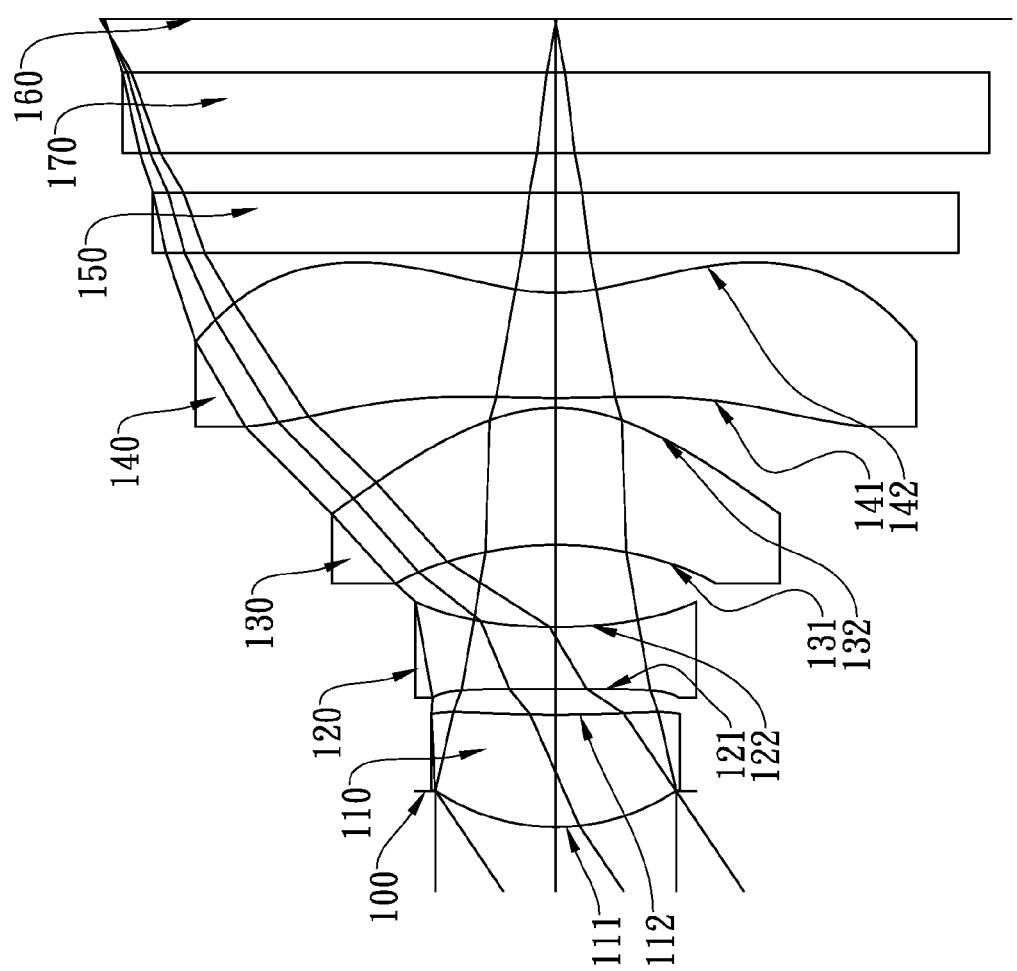
FIG. 1A shows an optical imaging lens assembly in accordance with a first embodiment of the present invention.

The present invention provides an optical imaging lens assembly comprising, in order from the object side to the image side: a first lens element with positive refractive power having a convex object-side surface; a second lens element with negative refractive power having a concave object-side surface and a concave image-side surface; a third lens element with positive refractive power having a concave object-side surface and a convex image-side surface; and a fourth lens element with negative refractive power having a concave image-side surface, the object-side and image-side surfaces thereof being aspheric; wherein the optical imaging lens assembly further comprises an aperture stop and an electronic sensor for image formation; wherein the aperture stop is disposed between the imaged object and the first lens element, the electronic sensor is disposed at the image plane, and there are four lens elements with refractive power; wherein the focal length of the optical imaging lens assembly is f, the focal length of the third lens element is f3, the focal length of the fourth lens element is f4, the radius of curvature on the object-side surface of the first lens element is R1, the radius of curvature on the object-side surface of the third lens element is R5, the distance on the optical axis between the object-side of the first lens element and the image-side surface of the second lens element is Dr1r4, the thickness on the optical axis of the third lens element is CT3, the distance on the optical axis between the aperture stop and the electronic sensor is SL, the distance on the optical axis between the object-side surface of the first lens element and the electronic sensor is TTL, and they satisfy the relation:

$-0.60 < R5/f < -0.20;$ $0.35 < f3/f < 0.91;$ $-0.83 < f4/f < -0.40;$ $1.00 < Dr1r4/CT3 < 1.75;$ $0.20 < R1/f < 0.41;$ $0.9 < SL/TTL < 1.1$

When the aforementioned optical imaging lens assembly satisfies the relation: $-0.60 < R5/f < -0.20$, the curvature of the object-side surface of the third lens element is more suitable for correcting the borderline light entry in order to reduce the generation of astigmatism; preferably, they satisfy the relation: $-0.55 < R5/f < -0.40$.

When the aforementioned optical imaging lens assembly satisfies the relation: $0.35 < f3/f < 0.91$, the positive refractive power needed in the system can be effectively distributed, while preventing any single lens element from having too much refractive power in order to effectively reduce the system sensitivity; preferably, they satisfy the relation: $0.45 < f3/f < 0.77$.

When the aforementioned optical imaging lens assembly satisfies the relation: $-0.83 < f4/f < -0.40$, aberration from the third lens element can be effectively corrected in order to increase system image quality; preferably, they satisfy the relation: $-0.77 < f4/f < -0.45$.

When the aforementioned optical imaging lens assembly satisfies the relation: $1.00 < Dr1r4/CT3 < 1.75$, the space allocation of the optical imaging lens assembly can be effectively arranged for best image quality of the system.

When the aforementioned optical imaging lens assembly satisfies the relation: $0.20 < R1/f < 0.41$, the first lens element can provide sufficient refractive power for the system while preventing the aberration from becoming too large.

When the aforementioned optical imaging lens assembly satisfies the relation: $0.9 < SL/TTL < 1.1$, the telecentric feature of the system can be favorably enhanced, which can reduce the total track length of the optical imaging lens assembly.

In the aforementioned optical imaging lens assembly, preferably, the second lens element is made of plastic, which is not only favorable for aspherical lens manufacturing but also able to effectively reduce the production costs.

In the aforementioned optical imaging lens assembly, preferably, the fourth lens element has a concave object-side surface. When the fourth lens element has bi-concave surfaces, the principal point of the optical system can be further away from the image plane, which can reduce the total optical track length of the system in order to maintain its compactness.

In the aforementioned optical imaging lens assembly, preferably, there is air distance between each lens element. The placement of air distance is to avoid interference among lens elements during assembly of aspherical lenses and to reduce the complexity of the assembly process.

In the aforementioned optical imaging lens assembly, preferably, the radius of curvature on the object-side surface of the second lens element is R3, the focal length of the optical imaging lens assembly is f, and they satisfy the relation: $-18.0 < R3/f < -2.5$. When R3/f satisfies the above relation, the Petzval Sum of the system can be effectively corrected, and the surrounding image plane can become flatter, in order to increase the image quality of the system.

In the aforementioned optical imaging lens assembly, preferably, the radius of curvature on the object-side surface of the fourth lens element is R7, the focal length of the optical imaging lens assembly is f, and they satisfy the relation: $|R7/f| > 1.3$. When $|R7/f|$ satisfies the above relation, generation of system aberration can be prevented, and high order aberration of the third lens element can be corrected.

In the aforementioned optical imaging lens assembly, preferably, the focal length of the third lens element is f3, the focal length of the fourth lens element is f4, and they satisfy the relation: $0.9 < |f3/f4| < 1.1$. When $|f3/f4|$ satisfies the above relation, the distribution of refractive power between the third lens element and the fourth lens element can be in balance while preventing generating too much aberration.

In the aforementioned optical imaging lens assembly, the radius of curvature on the object-side surface of the third lens element is R5, the radius of curvature on the image-side surface of the third lens element is R6, and preferably, they satisfy the relation: 2.25<(R5+R6)/(R5−R6)<5.00. When (R5+R6)/(R5−R6) satisfies the above relation, the astigmatism of the optical imaging lens assembly can be favorably corrected.

In the aforementioned optical imaging lens assembly, the distance on the optical axis between the object-side surface of the first lens element and the electronic sensor is TTL, half of the diagonal length of the effective pixel area of the electronic sensor is ImgH, and preferably, they satisfy the relation: TTL/ImgH<1.8. When TTL/ImgH satisfies the above relation, the compact size of the optical imaging lens assembly can be favorably maintained in order to be utilized in light weight electronics.

According to another aspect of the present invention, an optical imaging lens assembly comprises, in order from the object side to the image side: a first lens element with positive refractive power having a convex object-side surface; a second lens element with negative refractive power having a concave object-side surface and a concave image-side surface; a third lens element with positive refractive power having a concave object-side surface and a convex image-side surface; and a fourth lens element with negative refractive power having a concave image-side surface, the object-side and image-side surfaces thereof being aspheric; wherein there are four lens elements with refractive power; and wherein the focal length of the optical imaging lens assembly is f, the focal length of the third lens element is f3, the focal length of the fourth lens element is f4, the radius of curvature on the object-side surface of the second lens element is R3, the radius of curvature on the object-side surface of the third lens element is R5, the radius of curvature on the image-side surface of the third lens element is R6, the distance on the optical axis between the first lens element and the second lens element is T12, and they satisfy the relation:

$$-18.0 < R3/f < -2.5;$$

$$0.35 < f3/f < 0.91;$$

$$-0.83 < f4/f < -0.40;$$

$$2.25 < (R5+R6)/(R5-R6) < 5.00;$$

$$0.5 < (T12/f)*100 < 4.0$$

When the aforementioned optical imaging lens assembly satisfies the relation: −18.0<R3/f<−2.5, the Petzval Sum of the system can be effectively corrected, and the surrounding image plane will become flatter, in order to increase system image quality.

When the aforementioned optical imaging lens assembly satisfies the relation: 0.35<f3/f<0.91, the positive refractive power required by the system can be effectively distributed, preventing any single lens element from having too much refractive power, in order to effectively reduce the sensitivity of the system; preferably, they satisfy the relation: 0.45<f3/f<0.77.

When the aforementioned optical imaging lens assembly satisfies the relation: −0.83<f4/f<−0.40, the aberration of the third lens element can be effectively corrected in order to increase the system image quality; preferably, they satisfy the relation: −0.77<f4/f<−0.45.

When the aforementioned optical imaging lens assembly satisfies the relation: 2.25<(R5+R6)/(R5−R6)<5.00, the astigmatism of the optical imaging lens assembly can be favorably corrected.

When the aforementioned optical imaging lens assembly satisfies the relation: 0.5<(T12/f)*100<4.0, there is sufficient space between the first lens element and the second lens element for lens assembling, which can obtain a good balance between the ease of manufacturing and reduction in size of the lens assembly.

In the aforementioned optical imaging lens assembly, the distance on the optical axis between the aperture stop and the electronic sensor is SL, the distance on the optical axis between the object-side surface of the first lens element and the electronic sensor is TTL, and preferably, they satisfy the relation: 0.9<SL/TTL<1.1. When SL/TTL satisfies the above relation, the telecentric feature of the system can be favorably enhanced which can reduce the total track length of the optical imaging lens assembly.

In the aforementioned optical imaging lens assembly, the radius of curvature on the object-side surface of the fourth lens element is R7, the focal length of the optical imaging lens assembly is f, and preferably, they satisfy the relation: |R7/f1|>1.3. When |R7/f| satisfies the relation, generation of the aberration in the system can be prevented, and high order aberration of the third lens element can also be corrected.

In the aforementioned optical imaging lens assembly, the distance on the optical axis between the object-side surface of the first lens element and the image-side surface of the second lens element is Dr1r4, the thickness on the optical axis of the third lens element is CT3, and preferably, they satisfy the relation: 1.00<Dr1r4/CT3<1.75. When Dr1r4/CT3 satisfies the above relation, the spacing within the optical imaging lens assembly can be effectively allocated in order to increase the system image quality.

In the aforementioned optical imaging lens assembly, the radius of curvature on the object-side surface of the first lens element is R1, the radius of curvature on the image-side surface of the first lens element is R2, and preferably, they satisfy the relation: |R1/R2|<0.15. When |R1/R2| satisfies the above relation, the system spherical aberration can be favorably corrected.

In the aforementioned optical imaging lens assembly, the focal length of the third lens element is f3, the focal length of the fourth lens element is f4, and preferably, they satisfy the relation: 0.9<|f3/f4|<1.1. When |f3/f4| satisfies the above relation, the distribution of refractive power between the third lens element and the fourth lens element is balanced while preventing from generating too much aberration.

According to another aspect of the present invention, an optical imaging lens assembly comprises, in order from the object side to the image side: a first lens element with positive refractive power having a convex object-side surface; a second lens element with negative refractive power having a concave object-side surface and a concave image-side surface; a third lens element with positive refractive power having a concave object-side surface and a convex image-side surface, at least one of the object-side and image-side surfaces having at least one inflection point; and a fourth lens element with negative refractive power having a concave image-side surface, at least one inflection point on the image-side surface; wherein there are four lens elements with refractive power; and wherein the focal length of the optical imaging lens assembly is f, the focal length of the third lens element is f3, the focal length of the fourth lens element is f4, the radius of curvature on the object-side surface of the first lens element is R1, the radius of curvature on the image-side surface of the first lens element is R2, the radius of curvature on the object-side surface of the fourth lens element is R7, the distance on the optical axis between the aperture stop and the electronic sensor is SL, the distance on the optical axis between the object-side surface of the first lens element and the electronic sensor is TTL, and they satisfy the relation:

|R1/R2|<0.15;

0.35<f3/f<0.91;

−0.83<f4/f<−0.40;

|R7/f|>3.0;

0.9<SL/TTL<1.1

When the aforementioned optical imaging lens assembly satisfies the relation: |R1/R2|<0.15, the spherical aberration of the system can be favorably corrected; preferably, they satisfy the relation: |R1/R2|<0.07.

When the aforementioned optical imaging lens assembly satisfies the relation: 0.35<f3/f<0.91, the positive refractive power required by the system can be effectively distributed, preventing any single lens element having too much refractive power, in order to reduce the system sensitivity effectively; preferably, they satisfy the relation: 0.45<f3/f<0.77.

When the aforementioned optical imaging lens assembly satisfies the relation: −0.83<f4/f<−0.40, the aberration of the third lens element can be effectively corrected, in order to increase the image quality of the system.

When the aforementioned optical imaging lens assembly satisfies the relation: |R7/f|>3.0, the generation of system aberration can be prevented, and also the high order aberration of the third lens element can be corrected.

When the aforementioned optical imaging lens assembly satisfies the relation: 0.9<SL/TTL<1.1, the telecentric feature of the system can be enhanced, and the total track length of the optical imaging lens assembly can be further reduced.

In the aforementioned optical imaging lens assembly, preferably, the first lens element is made of glass. If the lens material is glass, the freedom of refractive power allocation of the system can be increased, and glass material is more resistant against environmental changes in the system, which contributes to better and more stable image quality of the optical system.

In the aforementioned optical imaging lens assembly, preferably, the fourth lens element has a concave object-side surface. When the fourth lens element has bi-concave surfaces, the principal point of the optical system can be further away from the image plane, which can reduce the total optical track length of the system and maintain the compact size of the lens assembly.

In the aforementioned optical imaging lens assembly, the Abbe number of the first lens element is V1, the Abbe number of the second lens element is V2, and preferably, they satisfy the relation: 31.0<V1−V2<42.0. When V1−V2 satisfies the above relation, the chromatic aberration of the optical imaging lens assembly can be favorably corrected.

In the aforementioned optical imaging lens assembly, the distance on the optical axis between the first and the second lens elements is T12, the focal length of the optical imaging lens assembly is f, and preferably, they satisfy the relation: 0.5<(T12/f)*100<4.0. When (T12/f)*100 satisfies the above relation, there is sufficient space between the first and the second lens elements for lens assembling, which can obtain a good balance between the ease of manufacturing and reduction in size of the lens assembly.

In the present optical imaging lens assembly, the lens elements can be made of glass or plastic. If the lens elements are made of glass, there is more freedom in distributing the refractive power of the system. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the optical imaging lens assembly can be effectively reduced.

In the present optical imaging lens assembly, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1B:
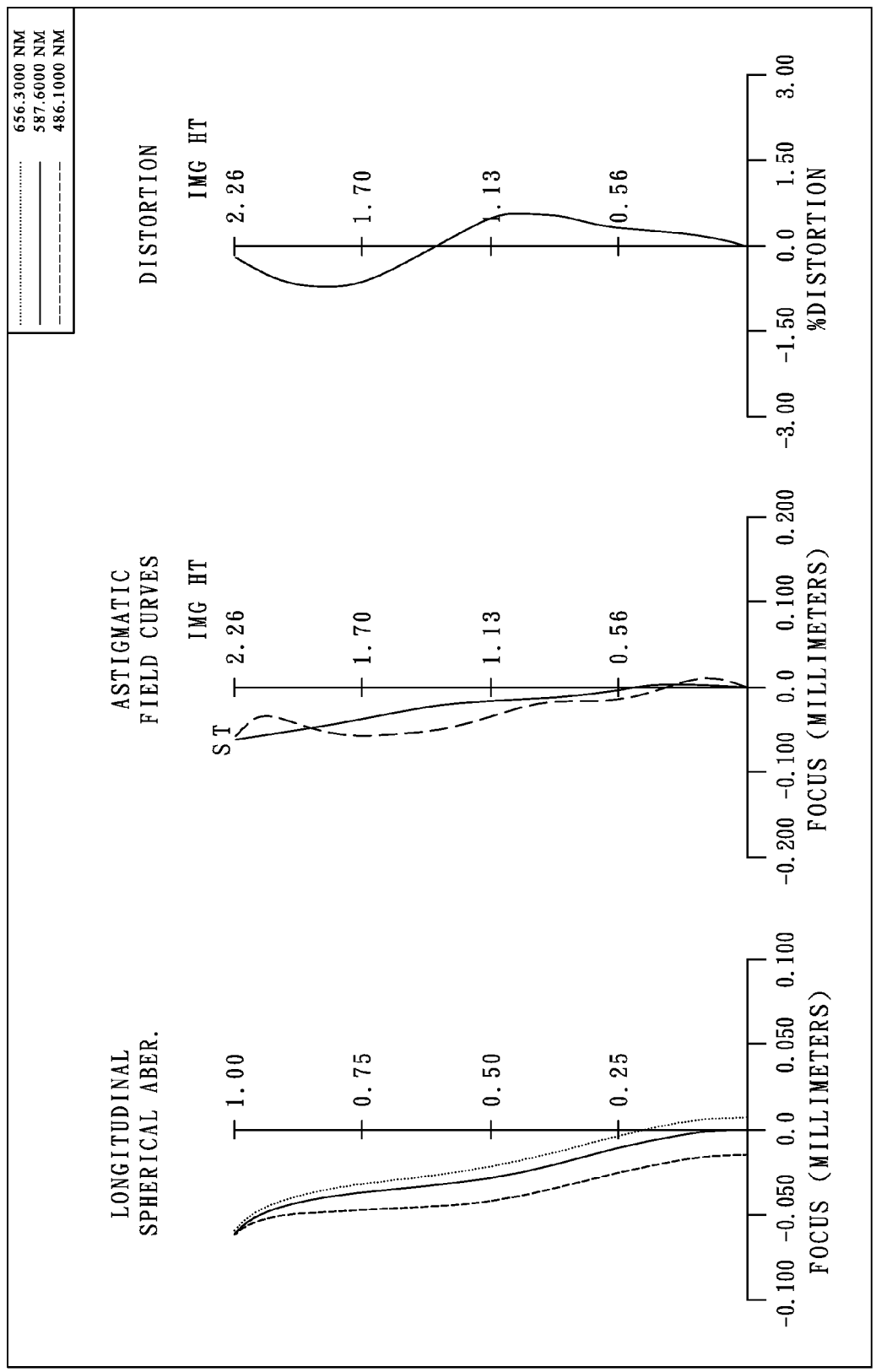
FIG. 1B shows the aberration curves of the first embodiment of the present invention.

FIG. 1A shows an optical imaging lens assembly in accordance with a first embodiment of the present invention, and FIG. 1B shows the aberration curves of the first embodiment of the present invention. The optical imaging lens assembly of the first embodiment of the present invention mainly comprises four lens elements, in order from the object side to the image side: a plastic first lens element 110 with positive refractive power having a convex object-side surface 111 and a concave image-side surface 112, the object-side and image-side surfaces 111 and 112 thereof being aspheric; a plastic second lens element 120 with negative refractive power having a concave object-side surface 121 and a concave image-side surface 122, the object-side and image-side surfaces 121 and 122 thereof being aspheric; a plastic third lens element 130 with positive refractive power having a concave object-side surface 131 and a convex image-side surface 132, the object-side and image-side surfaces 131 and 132 thereof being aspheric, at least one of the object-side surface 131 and image-side surface 132 having at least one inflection point; a plastic fourth lens element 140 with negative refractive power having a convex object-side surface 141 and a concave image-side surface 142, the object-side surface 141 and the image-side surface 142 thereof being aspheric, at least one inflection point formed on the image-side surface 142; wherein an aperture stop 100 is disposed between the imaged object and the first lens elements 110; wherein an IR filter 150 is disposed between the image-side surface 142 of the fourth lens element 140 and an image plane 160; and wherein a cover-glass is disposed between the IR filter 150 and the image plane 160. The IR filter 160 is made of glass and has no influence on the focal length of the optical imaging lens assembly, and the optical imaging lens assembly further comprises an electronic sensor disposed at the image plane 160 for image formation.

The equation of the aspheric surface profiles is expressed as follows:

$$X(Y) = (Y^2/R)/(1 + sqrt(1-(1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical imaging lens assembly, the focal length of the optical imaging lens assembly is f, and it satisfies the relation: f=3.34 (mm).

In the first embodiment of the present optical imaging lens assembly, the f-number of the optical imaging lens assembly is Fno, and it satisfies the relation: Fno=2.81.

In the first embodiment of the present optical imaging lens assembly, half of the maximal field of view of the optical imaging lens assembly is HFOV, and it satisfies the relation: HFOV=34.0 deg.

In the first embodiment of the present optical imaging lens assembly, the Abbe number of the first lens element 110 is V1, the Abbe number of the second lens element 120 is V2, and they satisfy the relation:

$V1-V2=33.1$

In the first embodiment of the present optical imaging lens assembly, the distance on the optical axis between the first lens element 110 and the second lens element 120 is T12, the focal length of the optical imaging lens assembly is f, and they satisfy the relation:

$(T12/f)*100=3.83$

In the first embodiment of the present optical imaging lens assembly, the distance on the optical axis between the object-side surface 111 of the first lens element 110 and the image-side surface 122 of the second lens element 120 is Dr1r4, the thickness on the optical axis of the third lens element 130 is CT3, and they satisfy the relation:

$Dr1r4/CT3=1.46$

In the first embodiment of the present optical imaging lens assembly, the radius of curvature of the object-side surface 111 of the first lens element 110 is R1, the focal length of the optical imaging lens assembly is f, and they satisfy the relation:

$R1/f=0.33$

In the first embodiment of the present optical imaging lens assembly, the radius of curvature on the object-side surface 111 of the first lens element 110 is R1, the radius of curvature on the image-side surface 112 of the first lens element 110 is R2, and they satisfy the relation:

$|R1/R2|=0.13$

In the first embodiment of the present optical imaging lens assembly, the radius of curvature on the object-side surface 131 of the third lens element 130 is R5, the radius of curvature on the image-side surface 132 of the third lens element 130 is R6, and they satisfy the relation:

$(R5+R6)/(R5-R6)=3.07$

In the first embodiment of the present optical imaging lens assembly, the radius of curvature on the object-side surface 121 of the second lens element 120 is R3, the focal length of the optical imaging lens assembly is f, and they satisfy the relation:

$R3/f=-14.97$

In the first embodiment of the present optical imaging lens assembly, the radius of curvature on the object-side surface 131 of the third lens element 130 is R5, the focal length of the optical imaging lens assembly is f, and they satisfy the relation:

$R5/f=-0.50$

In the first embodiment of the present optical imaging lens assembly, the radius of curvature on the object-side surface 141 of the fourth lens element 140 is R7, the focal length of the optical imaging lens assembly is f, and they satisfy the relation:

$|R7/f|=2.03$

In the first embodiment of the present optical imaging lens assembly, the focal length of the third lens element 130 is f3, the focal length of the optical imaging lens assembly is f, and they satisfy the relation:

$f3/f=0.74$

In the first embodiment of the present optical imaging lens assembly, the focal length of the fourth lens element 140 is f4, the focal length of the optical imaging lens assembly is f, and they satisfy the relation:

$f4/f=-0.74$

In the first embodiment of the present optical imaging lens assembly, the focal length of the third lens element 130 is f3, the focal length of the fourth lens element 140 is f4, and they satisfy the relation:

$|f3/f4|=1.01$

In the first embodiment of the present optical imaging lens assembly, the distance on the optical axis between the aperture stop 100 and the electronic sensor is SL, the distance on the optical axis between the object-side surface 111 of the first lens element 110 and the electronic sensor is TTL, and they satisfy the relation:

$SL/TTL=0.95$

In the first embodiment of the present optical imaging lens assembly, the distance on the optical axis between the object-side surface 111 of the first lens element 110 and the electronic sensor is TTL, half of the diagonal length of the effective pixel area of the electronic sensor is ImgH, and they satisfy the relation:

$TTL/ImgH=1.68$

The detailed optical data of the first embodiment is shown in FIG. 7 (TABLE 1), and the aspheric surface data is shown in FIG. 8 (TABLE 2), wherein the units of the radius of curvature, the thickness and the focal length are expressed in mm, and HFOV is half of the maximal field of view.

Figure 2A:
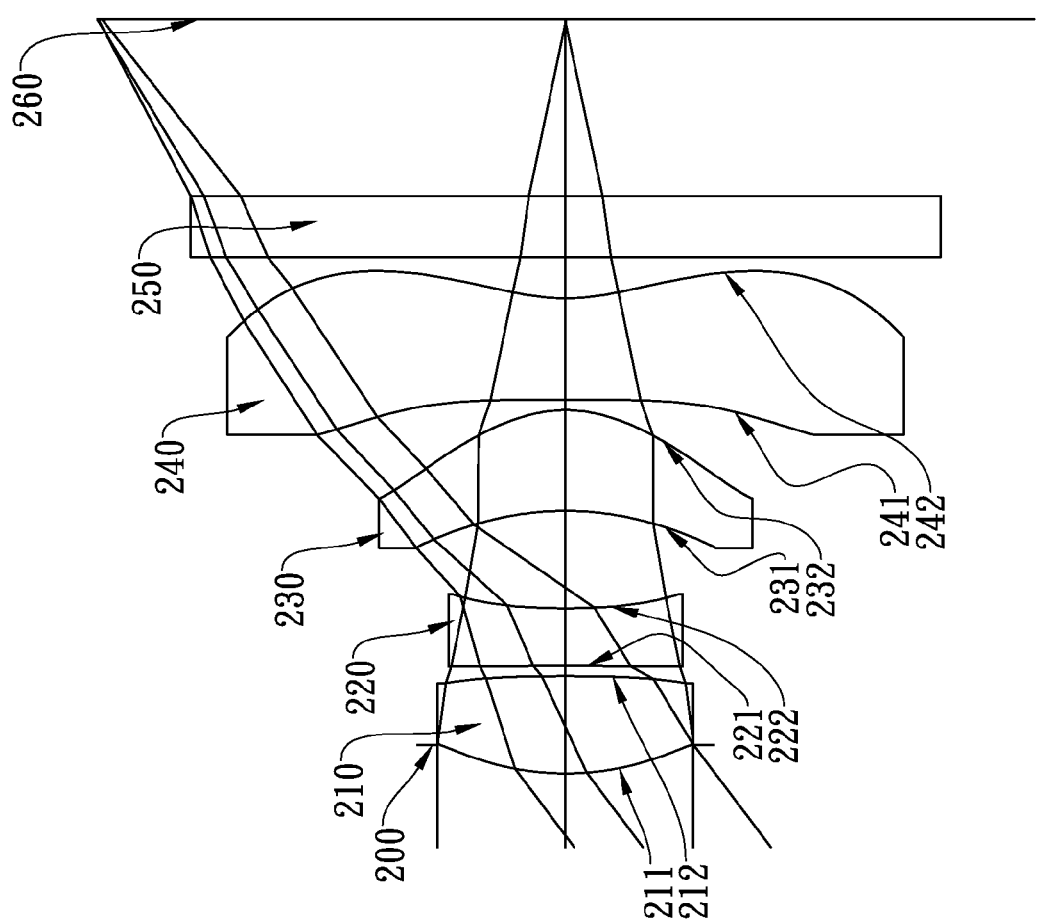
FIG. 2A shows an optical imaging lens assembly in accordance with a second embodiment of the present invention.
Figure 2B:
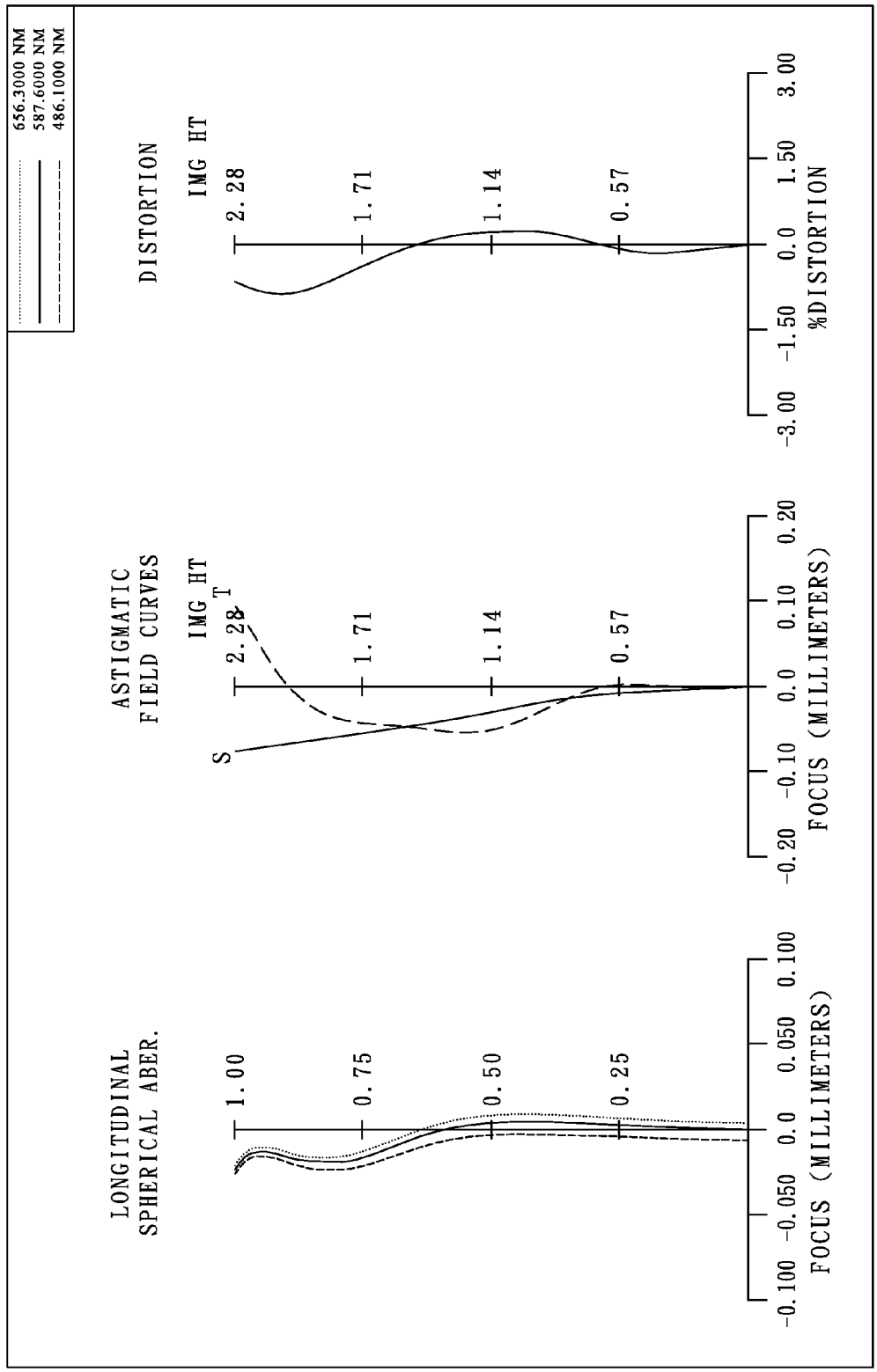
FIG. 2B shows the aberration curves of the second embodiment of the present invention.

FIG. 2A shows an optical imaging lens assembly in accordance with a second embodiment of the present invention, and FIG. 2B shows the aberration curves of the second embodiment of the present invention. The optical imaging lens assembly of the second embodiment of the present invention mainly comprises four lens elements, in order from the object side to the image side: a plastic first lens element 210 with positive refractive power having a convex object-side surface 211 and a convex image-side surface 212, the object-side and image-side surfaces 211 and 212 thereof being aspheric; a plastic second lens element 220 with negative refractive power having a concave object-side surface 221 and a concave image-side surface 222, the object-side and image-side surfaces 221 and 222 thereof being aspheric; a plastic third lens element 230 with positive refractive power having a concave object-side surface 231 and a convex image-side surface 232, the object-side and image-side surfaces 231 and 232 thereof being aspheric, at least one of the two surfaces having at least one inflection point; and a plastic fourth lens element 240 with negative refractive power having a concave object-side surface 241 and a concave image-side surface 242, the object-side and image-side surfaces 241 and 242 thereof being aspheric, at least one inflection point on the image-side surface 242; wherein an aperture stop 200 is disposed between the imaged object and the first lens element 210; wherein an IR filter 250 is disposed between the image-side surface 242 of the fourth lens element 240 and an image plane 260; and wherein the IR filter 250 is made of glass and has no influence on the focal length of the optical imaging lens assembly, and the optical imaging lens assembly further comprises an electronic sensor at the image plane 260 for image formation.

The equation of the aspheric surface profiles of the second embodiment has the same form as that of the first embodiment.

In the second embodiment of the present optical imaging lens assembly, the focal length of the optical imaging lens assembly is f, and it satisfies the relation: f=3.05 (mm).

In the second embodiment of the present optical imaging lens assembly, the f-number of the optical imaging lens assembly is Fno, and it satisfies the relation: Fno=2.45.

In the second embodiment of the present optical imaging lens assembly, half of the maximal field of view of the optical imaging lens assembly is HFOV, and it satisfies the relation: HFOV=37.0 deg.

In the second embodiment of the present optical imaging lens assembly, the Abbe number of the first lens element 210 is V1, the Abbe number of the second lens element 220 is V2, and they satisfy the relation:

$V1-V2=32.5$.

In the second embodiment of the present optical imaging lens assembly, the distance on the optical axis between the first lens element 210 and the second lens element 220 is T12, the focal length of the optical imaging lens assembly is f, and they satisfy the relation:

$(T12/f)*100=1.64$

In the second embodiment of the present optical imaging lens assembly, the distance on the optical axis between the object-side surface 211 of the first lens element 210 and the image-side surface 222 of the second lens element 220 is Dr1r4, the thickness on the optical axis of the third lens element 230 is CT3, and they satisfy the relation:

$Dr1r4/CT3=1.64$

In the second embodiment of the present optical imaging lens assembly, the radius of curvature of the object-side surface 211 of the first lens element 210 is R1, the focal length of the optical imaging lens assembly is f, and they satisfy the relation:

$R1/f=0.42$

In the second embodiment of the present optical imaging lens assembly, the radius of curvature on the object-side surface 211 of the first lens element 210 is R1, the radius of curvature on the image-side surface 212 of the first lens element 210 is R2, and they satisfy the relation:

$|R1/R2|=0.21$

In the second embodiment of the present optical imaging lens assembly, the radius of curvature on the object-side surface 231 of the third lens element 230 is R5, the radius of curvature on the image-side surface 232 of the third lens element 230 is R6, and they satisfy the relation:

$(R5+R6)/(R5-R6)=2.62$

In the second embodiment of the present optical imaging lens assembly, the radius of curvature on the object-side surface 221 of the second lens element 220 is R3, the focal length of the optical imaging lens assembly is f, and they satisfy the relation:

$R3/f=-2.88$

In the second embodiment of the present optical imaging lens assembly, the radius of curvature on the object-side surface 231 of the third lens element 230 is R5, the focal length of the optical imaging lens assembly is f, and they satisfy the relation:

$R5/f=-0.48$

In the second embodiment of the present optical imaging lens assembly, the radius of curvature on the object-side surface 241 of the fourth lens element 240 is R7, the focal length of the optical imaging lens assembly is f, and they satisfy the relation:

$|R7/f|=32.79$

In the second embodiment of the present optical imaging lens assembly, the focal length of the third lens element 230 is f3, the focal length of the optical imaging lens assembly is f, and they satisfy the relation:

$f3/f=0.59$

In the second embodiment of the present optical imaging lens assembly, the focal length of the fourth lens element 240 is f4, the focal length of the optical imaging lens assembly is f, and they satisfy the relation:

$f4/f=-0.58$

In the second embodiment of the present optical imaging lens assembly, the focal length of the third lens element 230 is f3, the focal length of the fourth lens element 240 is f4, and they satisfy the relation:

$|f3/f4|=1.01$

In the second embodiment of the present optical imaging lens assembly, the distance on the optical axis between the aperture stop 200 and the electronic sensor is SL, the distance on the optical axis between the object-side surface 211 of the first lens element 210 and the electronic sensor is TTL, and they satisfy the relation:

$SL/TTL=0.96$.

In the second embodiment of the present optical imaging lens assembly, the distance on the optical axis between the object-side surface 211 of the first lens element 210 and the electronic sensor is TTL, half of the diagonal length of the effective pixel area of the electronic sensor is ImgH, and they satisfy the relation:

$TTL/ImgH=1.57$.

The detailed optical data of the second embodiment is shown in FIG. 9 (TABLE 3), and the aspheric surface data is shown in FIG. 10 (TABLE 4), wherein the units of the radius of curvature, the thickness and the focal length are expressed in mm, and HFOV is half of the maximal field of view.

Figure 3A:
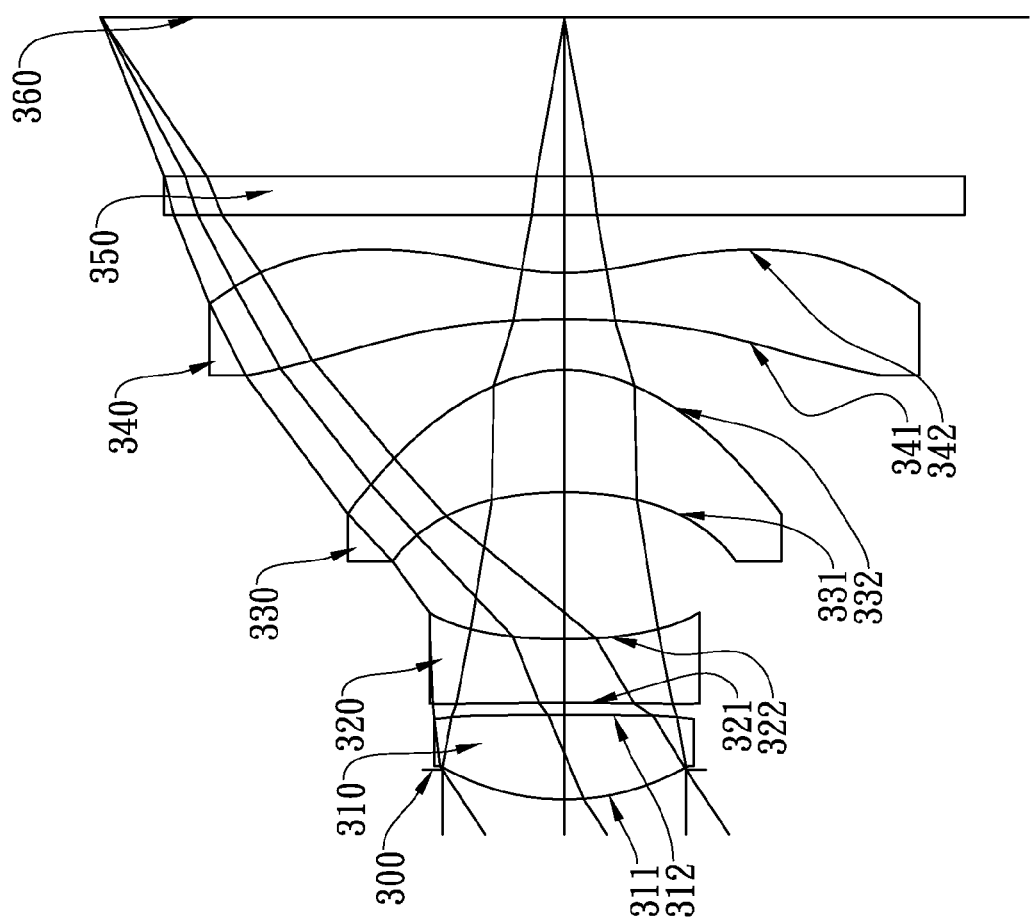
FIG. 3A shows an optical imaging lens assembly in accordance with a third embodiment of the present invention.
Figure 3B:
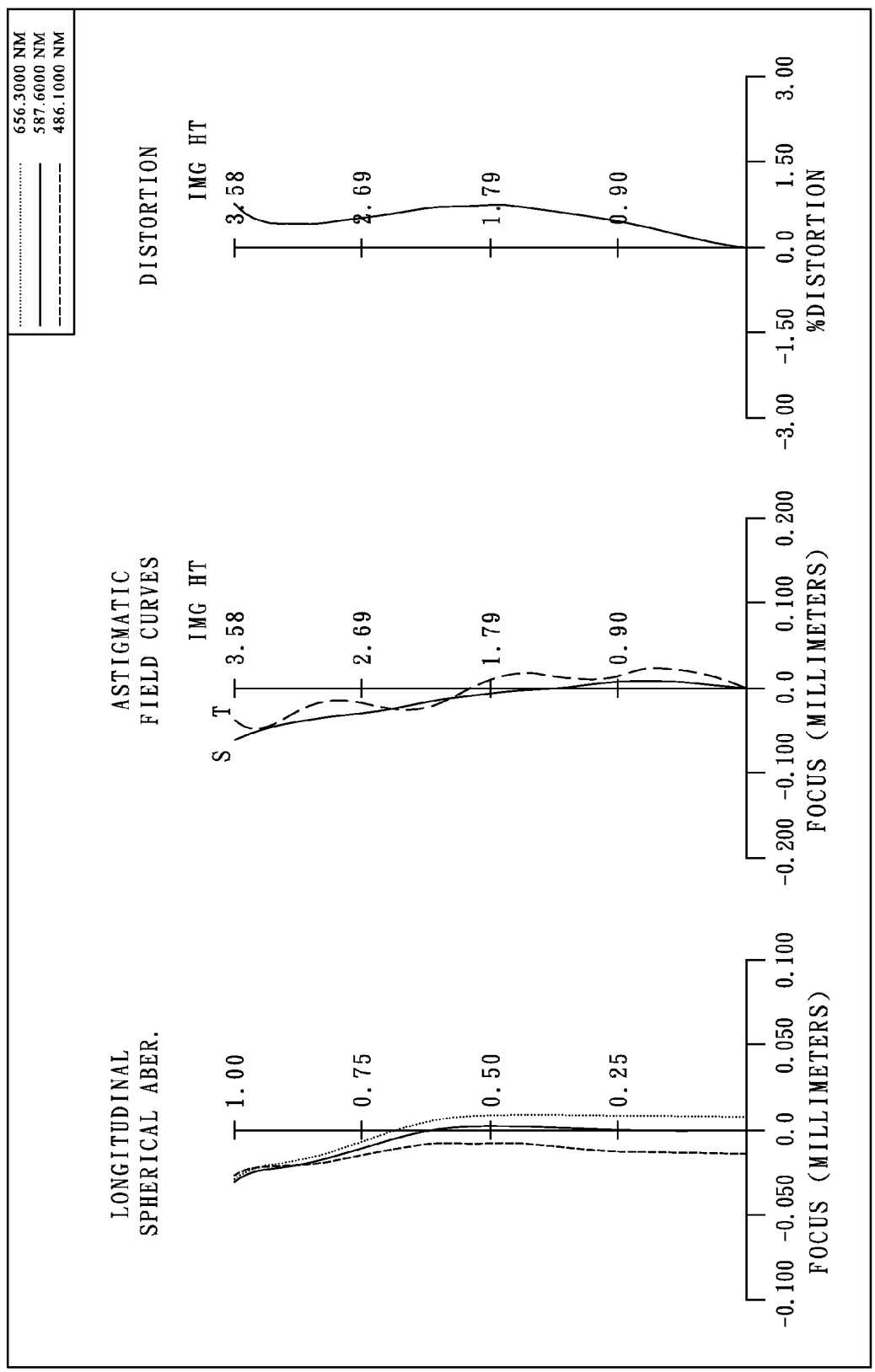
FIG. 3B shows the aberration curves of the third embodiment of the present invention.

FIG. 3A shows an optical imaging lens assembly in accordance with a third embodiment of the present invention, and FIG. 3B shows the aberration curves of the third embodiment of the present invention. The optical imaging lens assembly of the third embodiment of the present invention mainly comprises four lens elements, in order from the object side to the image side: a plastic first lens element 310 with positive refractive power having a convex object-side surface 311 and a convex image-side surface 312, the object-side and image-side surfaces 311 and 312 thereof being aspheric; a plastic second lens element 320 with negative refractive power having a concave object-side surface 321 and a concave image-side surface 322, the object-side and image-side surfaces 321 and 322 thereof being aspheric; a plastic third lens element 330 with positive refractive power having a concave object-side surface 331 and a convex image-side surface 332, the object-side and image-side surfaces 331 and 332 thereof being aspheric; and a plastic fourth lens element 340 with negative refractive power having a concave object-side surface 341 and a concave image-side surface 342, the object-side and image-side surfaces 341 and 342 thereof being aspheric, at least one inflection point formed on the image-side surface 342; wherein an aperture stop 300 is disposed between the imaged object and the first lens element 310; wherein an IR filter 350 is disposed between the image-side surface 342 of the fourth lens element 340 and an image plane 360; and wherein the IR filter 360 is made of glass and has no influence on the focal length of the optical imaging lens assembly, and the optical imaging lens assembly further comprises an electronic sensor at the image plane 360 for image formation.

The equation of the aspheric surface profiles of the third embodiment has the same form as that of the first embodiment.

In the third embodiment of the present optical imaging lens assembly, the focal length of the optical imaging lens assembly is f, and it satisfies the relation: f=5.40 (mm).

In the third embodiment of the present optical imaging lens assembly, the f-number of the optical imaging lens assembly is Fno, and it satisfies the relation: Fno=2.85.

In the third embodiment of the present optical imaging lens assembly, half of the maximal field of view of the optical imaging lens assembly is HFOV, and it satisfies the relation: HFOV=33.5 deg.

In the third embodiment of the present optical imaging lens assembly, the Abbe number of the first lens element 310 is V1, the Abbe number of the second lens element 320 is V2, and they satisfy the relation:

$V1-V2=32.5$

In the third embodiment of the present optical imaging lens assembly, the distance on the optical axis between the first lens element 310 and the second lens element 320 is T12, the focal length of the optical imaging lens assembly is f, and they satisfy the relation:

$(T12/f)*100=1.74$

In the third embodiment of the present optical imaging lens assembly, the distance on the optical axis between the object-side surface 311 of the first lens element 310 and the image-side surface 322 of the second lens element 320 is Dr1r4, the thickness on the optical axis of the third lens element 330 is CT3, and they satisfy the relation:

$Dr1r4/CT3=1.31$

In the third embodiment of the present optical imaging lens assembly, the radius of curvature of the object-side surface 311 of the first lens element 310 is R1, the focal length of the optical imaging lens assembly is f, and they satisfy the relation:

$R1/f=0.35$

In the third embodiment of the present optical imaging lens assembly, the radius of curvature on the object-side surface 311 of the first lens element 310 is R1, the radius of curvature on the image-side surface 312 of the first lens element 310 is R2, and they satisfy the relation:

$|R1/R2|=0.02$

In the third embodiment of the present optical imaging lens assembly, the radius of curvature on the object-side surface 331 of the third lens element 330 is R5, the radius of curvature on the image-side surface 332 of the third lens element 330 is R6, and they satisfy the relation:

$(R5+R6)/(R5-R6)=2.27$

In the third embodiment of the present optical imaging lens assembly, the radius of curvature on the object-side surface 321 of the second lens element 320 is R3, the focal length of the optical imaging lens assembly is f, and they satisfy the relation:

$R3/f=-9.26$

In the third embodiment of the present optical imaging lens assembly, the radius of curvature on the object-side surface 331 of the third lens element 330 is R5, the focal length of the optical imaging lens assembly is f, and they satisfy the relation:

$R5/f=-0.53$

In the third embodiment of the present optical imaging lens assembly, the radius of curvature on the object-side surface 341 of the fourth lens element 340 is R7, the focal length of the optical imaging lens assembly is f, and they satisfy the relation:

$|R7/f|=1.52$

In the third embodiment of the present optical imaging lens assembly, the focal length of the third lens element 330 is f3, the focal length of the optical imaging lens assembly is f, and they satisfy the relation:

$f3/f=0.53$

In the third embodiment of the present optical imaging lens assembly, the focal length of the fourth lens element 340 is f4, the focal length of the optical imaging lens assembly is f, and they satisfy the relation:

$f4/f=-0.50$

In the third embodiment of the present optical imaging lens assembly, the focal length of the third lens element 330 is f3, the focal length of the fourth lens element 340 is f4, and they satisfy the relation:

$|f3/f4|=1.05$

In the third embodiment of the present optical imaging lens assembly, the distance on the optical axis between the aperture stop 300 and the electronic sensor is SL, the distance on the optical axis between the object-side surface 311 of the first lens element 310 and the electronic sensor is TTL, and they satisfy the relation:

$SL/TTL=0.96$

In the third embodiment of the present optical imaging lens assembly, the distance on the optical axis between the object-side surface 311 of the first lens element 310 and the electronic sensor is TTL, half of the diagonal length of the effective pixel area of the electronic sensor is ImgH, and they satisfy the relation:

$TTL/ImgH=1.67$

The detailed optical data of the third embodiment is shown in FIG. 11 (TABLE 5), and the aspheric surface data is shown in FIG. 12 (TABLE 6), wherein the units of the radius of curvature, the thickness and the focal length are expressed in mm, and HFOV is half of the maximal field of view.

Figure 4A:
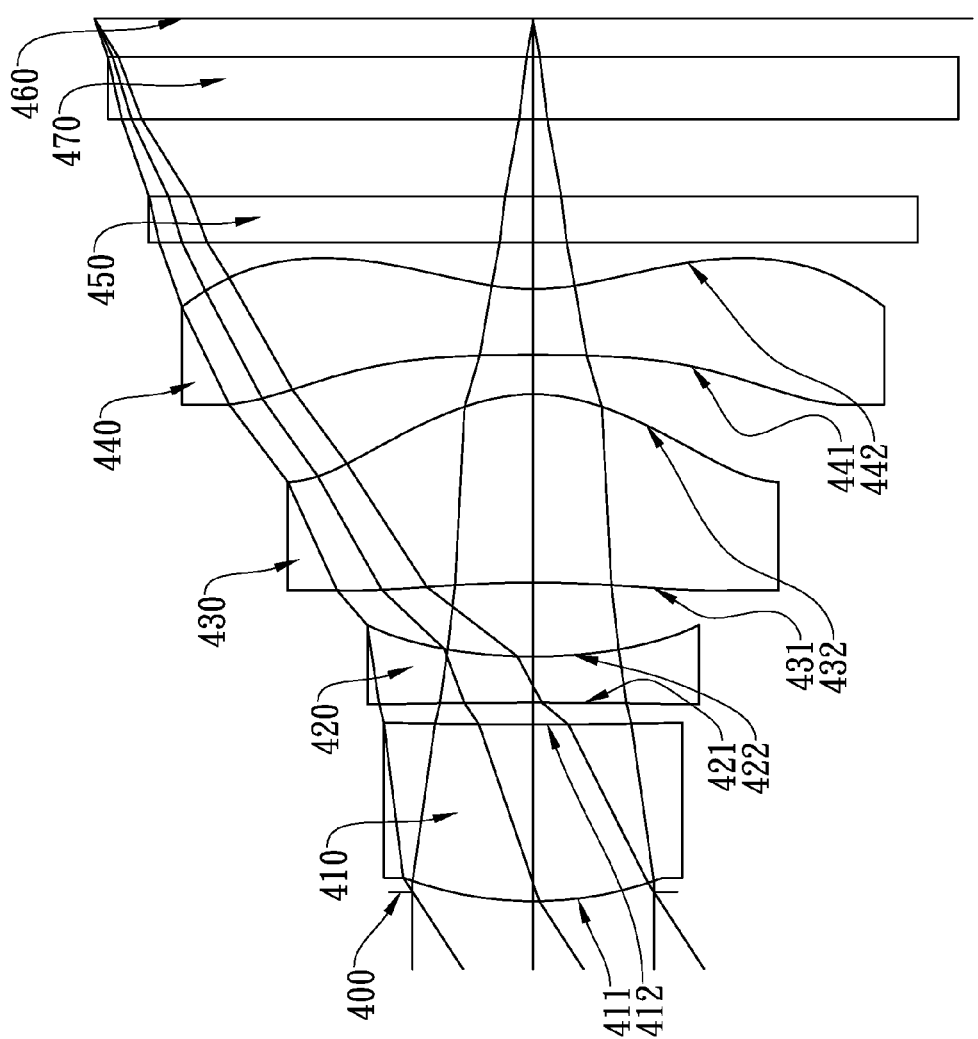
FIG. 4A shows an optical imaging lens assembly in accordance with a fourth embodiment of the present invention.
Figure 4B:
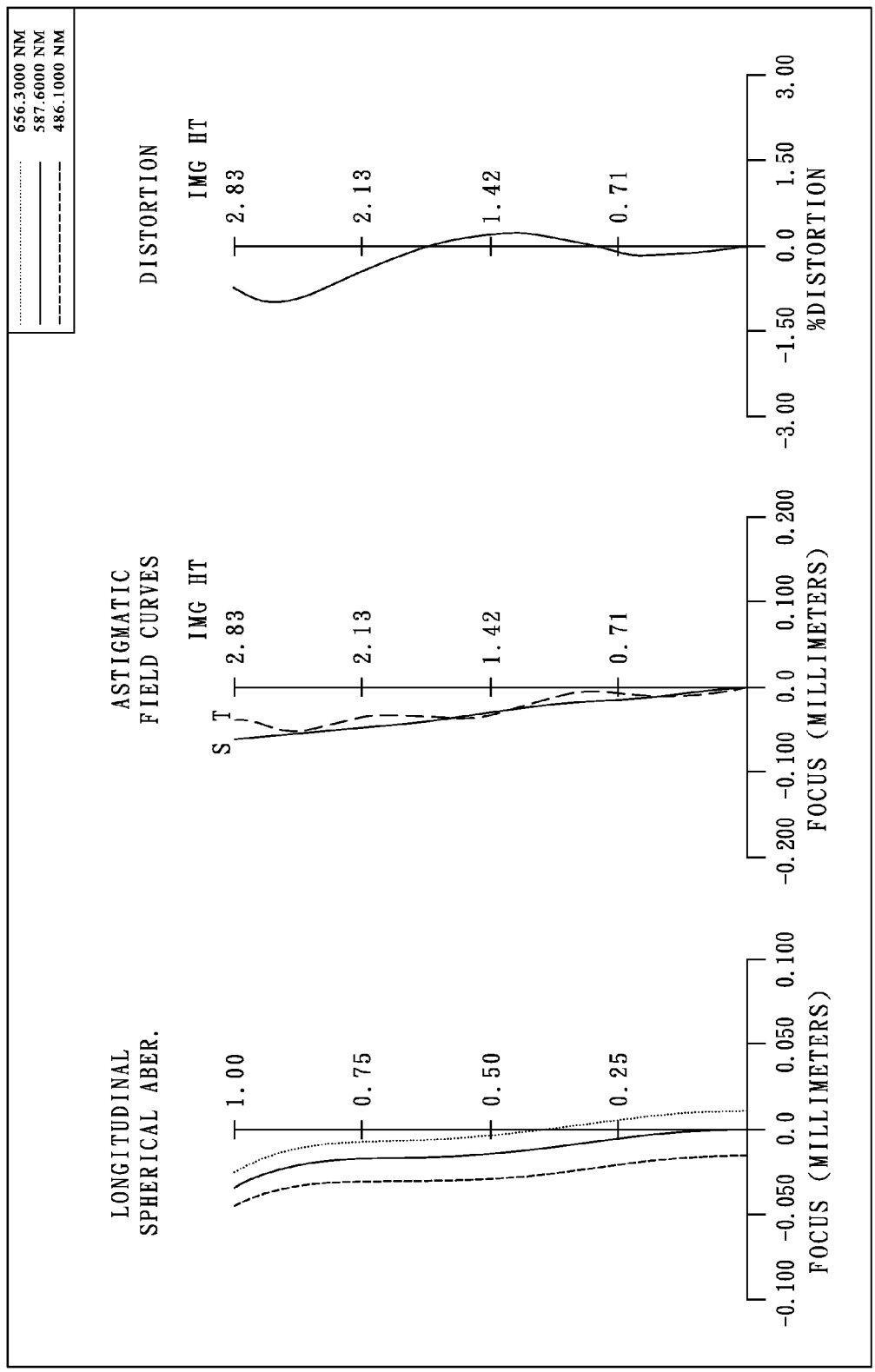
FIG. 4B shows the aberration curves of the fourth embodiment of the present invention.

FIG. 4A shows an optical imaging lens assembly in accordance with a fourth embodiment of the present invention, and FIG. 4B shows the aberration curves of the fourth embodiment of the present invention. The optical imaging lens assembly of the fourth embodiment of the present invention mainly comprises four lens elements, in order from the object side to the image side: a plastic first lens element 410 with positive refractive power having a convex object-side surface 411 and a concave image-side surface 412, the object-side and image-side surfaces 411 and 412 thereof being aspheric; a plastic second lens element 420 with negative refractive power having a concave object-side surface 421 and a concave image-side surface 422, the object-side and image-side surfaces 421 and 422 thereof being aspheric; a plastic third lens element 430 with positive refractive power having a concave object-side surface 431 and a convex image-side surface 432, the object-side and image-side surfaces 431 and 432 thereof being aspheric, at least one of the surfaces having at least one inflection point; and a plastic fourth lens element 440 with negative refractive power having a concave object-side surface 441 and a concave image-side surface 442, the object-side and image-side surfaces 441 and 442 thereof being aspheric, at least one inflection point formed on the image-side surface 442; wherein an aperture stop 400 is disposed between the imaged object and the first lens element 410; wherein an IR filter 450 is disposed between the image-side surface 442 of the fourth lens element 440 and an image plane 460; and wherein a cover-glass 470 is disposed between the IR filter 450 and the image plane 460. The IR filter 450 is made of glass and has no influence on the focal length of the optical imaging lens assembly, and the optical imaging lens assembly further comprises an electronic sensor disposed at the image plane 460 for image formation.

The equation of the aspheric surface profiles of the fourth embodiment has the same form as that of the first embodiment.

In the fourth embodiment of the present optical imaging lens assembly, the focal length of the optical imaging lens assembly is f, and it satisfies the relation: f=4.40 (mm).

In the fourth embodiment of the present optical imaging lens assembly, the f-number of the optical imaging lens assembly is Fno, and it satisfies the relation: Fno=2.83.

In the fourth embodiment of the present optical imaging lens assembly, half of the maximal field of view of the optical imaging lens assembly is HFOV, and it satisfies the relation: HFOV=33.0 deg.

In the fourth embodiment of the present optical imaging lens assembly, the Abbe number of the first lens element 410 is V1, the Abbe number of the second lens element 420 is V2, and they satisfy the relation:

$$V1-V2=31.3.$$

In the fourth embodiment of the present optical imaging lens assembly, the distance on the optical axis between the first lens element 410 and the second lens element 420 is T12, the focal length of the optical imaging lens assembly is f, and they satisfy the relation:

$$(T12/f)*100=3.20$$

In the fourth embodiment of the present optical imaging lens assembly, the distance on the optical axis between the object-side surface 411 of the first lens element 410 and the image-side surface 422 of the second lens element 420 is Dr1r4, the thickness on the optical axis of the third lens element 430 is CT3, and they satisfy the relation:

$$Dr1r4/CT3=1.30$$

In the fourth embodiment of the present optical imaging lens assembly, the radius of curvature of the object-side surface 411 of the first lens element 410 is R1, the focal length of the optical imaging lens assembly is f, and they satisfy the relation:

$$R1/f=0.54$$

In the fourth embodiment of the present optical imaging lens assembly, the radius of curvature on the object-side surface 411 of the first lens element 410 is R1, the radius of curvature on the image-side surface 412 of the first lens element 410 is R2, and they satisfy the relation:

$$|R1/R2|=0.06$$

In the fourth embodiment of the present optical imaging lens assembly, the radius of curvature on the object-side surface 431 of the third lens element 430 is R5, the radius of curvature on the image-side surface 432 of the third lens element 430 is R6, and they satisfy the relation:

$$(R5+R6)/(R5-R6)=1.37$$

In the fourth embodiment of the present optical imaging lens assembly, the radius of curvature on the object-side surface 421 of the second lens element 420 is R3, the focal length of the optical imaging lens assembly is f, and they satisfy the relation:

$$R3/f=-10.82$$

In the fourth embodiment of the present optical imaging lens assembly, the radius of curvature on the object-side surface 431 of the third lens element 430 is R5, the focal length of the optical imaging lens assembly is f, and they satisfy the relation:

$$R5/f=-1.65$$

In the fourth embodiment of the present optical imaging lens assembly, the radius of curvature on the object-side surface 441 of the fourth lens element 440 is R7, the focal length of the optical imaging lens assembly is f, and they satisfy the relation:

$$|R7/f|=3.36$$

In the fourth embodiment of the present optical imaging lens assembly, the focal length of the third lens element 430 is f3, the focal length of the optical imaging lens assembly is f, and they satisfy the relation:

$$f3/f=0.52$$

In the fourth embodiment of the present optical imaging lens assembly, the focal length of the fourth lens element 440 is f4, the focal length of the optical imaging lens assembly is f, and they satisfy the relation:

$$f4/f=-0.55$$

In the fourth embodiment of the present optical imaging lens assembly, the focal length of the third lens element 430 is f3, the focal length of the fourth lens element 440 is f4, and they satisfy the relation:

$$|f3/f4|=0.95$$

In the fourth embodiment of the present optical imaging lens assembly, the distance on the optical axis between the aperture stop 400 and the electronic sensor is SL, the distance on the optical axis between the object-side surface 411 of the first lens element 410 and the electronic sensor is TTL, and they satisfy the relation:

$$SL/TTL=0.99.$$

In the fourth embodiment of the present optical imaging lens assembly, the distance on the optical axis between the object-side surface 411 of the first lens element 410 and the electronic sensor is TTL, half of the diagonal length of the effective pixel area of the electronic sensor is ImgH, and they satisfy the relation:

$$TTL/ImgH=1.93.$$

The detailed optical data of the fourth embodiment is shown in FIG. 13 (TABLE 7), and the aspheric surface data is shown in FIG. 14 (TABLE 8), wherein the units of the radius of curvature, the thickness and the focal length are expressed in mm, and HFOV is half of the maximal field of view.

Figure 5A:
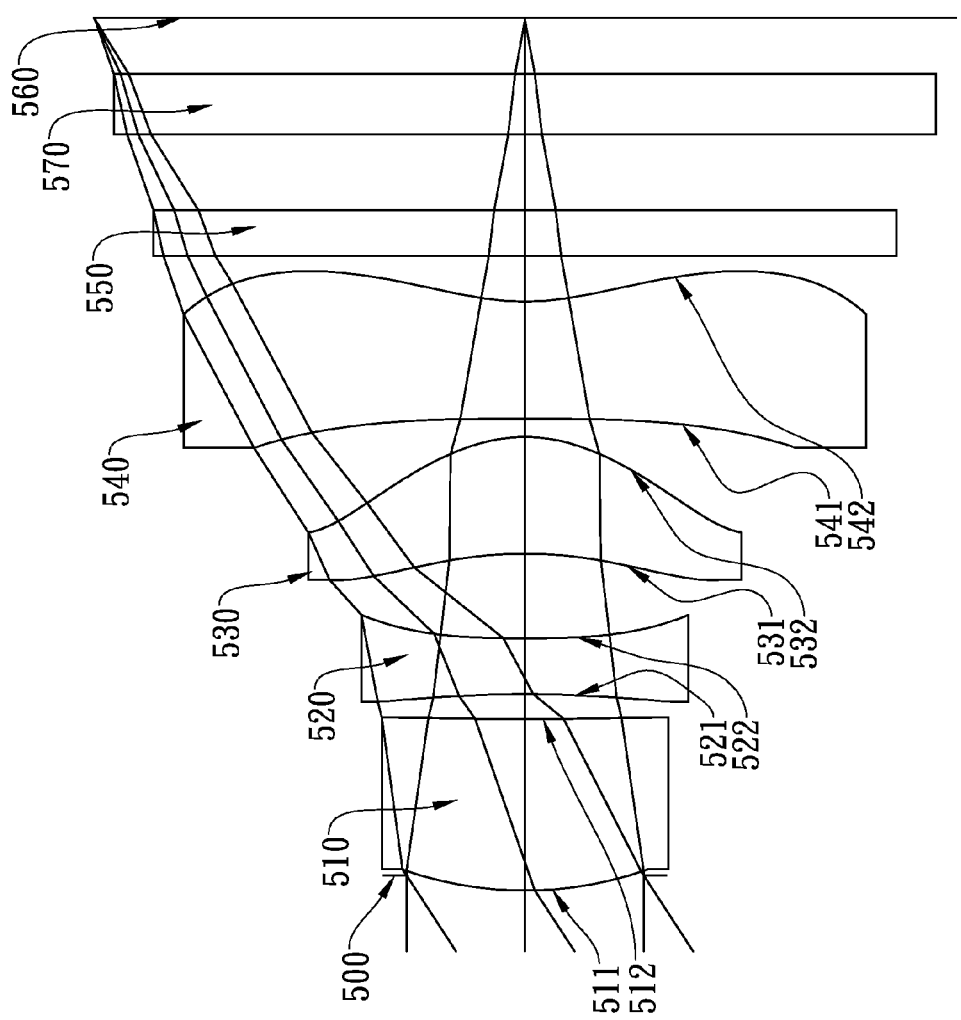
FIG. 5A shows an optical imaging lens assembly in accordance with a fifth embodiment of the present invention.
Figure 5B:
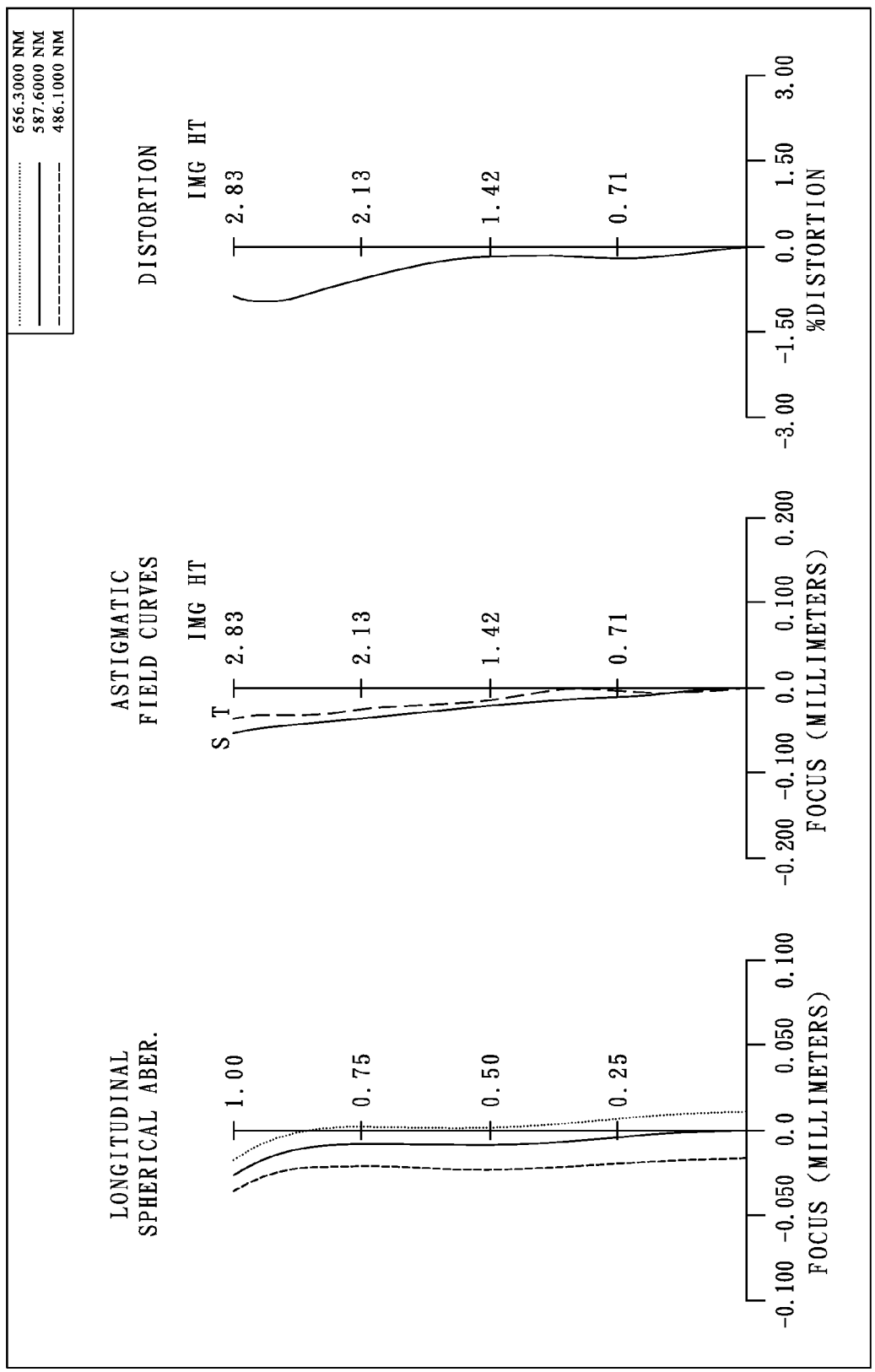
FIG. 5B shows the aberration curves of the fifth embodiment of the present invention.

FIG. 5A shows an optical imaging lens assembly in accordance with a fifth embodiment of the present invention, and FIG. 5B shows the aberration curves of the fifth embodiment of the present invention. The optical imaging lens assembly of the fifth embodiment of the present invention mainly comprises four lens elements, in order from the object side to the image side: a glass first lens element 510 with positive refractive power having a convex object-side surface 511 and a concave image-side surface 512, the object-side and image-side surfaces 511 and 512 thereof being aspheric; a plastic second lens element 520 with negative refractive power having a concave object-side surface 521 and a concave image-side surface 522, the object-side and image-side surfaces 521 and 522 thereof being aspheric; a plastic third lens element 530 with positive refractive power having a concave object-side surface 531 and a convex image-side surface 532, the object-side and image-side surfaces 531 and 532 thereof being aspheric, at least one of the surfaces having at least one inflection point; and a plastic fourth lens element 540 with negative refractive power having a concave object-side surface 541 and a concave image-side surface 542, the object-side and image-side surfaces 541 and 542 thereof being aspheric, at least one inflection point formed on the image-side surface 542; wherein an aperture stop 500 is disposed between the imaged object and the first lens elements 510; wherein an IR filter 550 is disposed between the image-side surface 542 of the fourth lens element 540 and an image plane 560; wherein a cover-glass 570 is disposed between the IR filter 550 and the image plane 560. The IR filter 550 is made of glass and has no influence on the focal length of the optical imaging lens assembly, and the optical imaging lens assembly further comprises an electronic sensor disposed at the image plane 560 for image formation.

The equation of the aspheric surface profiles of the fifth embodiment has the same form as that of the first embodiment.

In the fifth embodiment of the present optical imaging lens assembly, the focal length of the optical imaging lens assembly is f, and it satisfies the relation: f=4.41 (mm).

In the fifth embodiment of the present optical imaging lens assembly, the f-number of the optical imaging lens assembly is Fno, and it satisfies the relation: Fno=2.83.

In the fifth embodiment of the present optical imaging lens assembly, half of the maximal field of view of the optical imaging lens assembly is HFOV, and it satisfies the relation: HFOV=33.0 deg.

In the fifth embodiment of the present optical imaging lens assembly, the Abbe number of the first lens element 510 is V1, the Abbe number of the second lens element 520 is V2, and they satisfy the relation:

$V1-V2=31.3$

In the fifth embodiment of the present optical imaging lens assembly, the distance on the optical axis between the first lens element 510 and the second lens element 520 is T12, the focal length of the optical imaging lens assembly is f, and they satisfy the relation:

$(T12/f)*100=3.72$

In the fifth embodiment of the present optical imaging lens assembly, the distance on the optical axis between the object-side surface 511 of the first lens element 510 and the image-side surface 522 of the second lens element 520 is Dr1r4, the thickness on the optical axis of the third lens element 530 is CT3, and they satisfy the relation:

$Dr1r4/CT3=2.16$

In the fifth embodiment of the present optical imaging lens assembly, the radius of curvature of the object-side surface 511 of the first lens element 510 is R1, the focal length of the optical imaging lens assembly is f, and they satisfy the relation:

$R1/f=0.54$

In the fifth embodiment of the present optical imaging lens assembly, the radius of curvature on the object-side surface 511 of the first lens element 510 is R1, the radius of curvature on the image-side surface 512 of the first lens element 510 is R2, and they satisfy the relation:

$|R1/R2|=0.06$

In the fifth embodiment of the present optical imaging lens assembly, the radius of curvature on the object-side surface 531 of the third lens element 530 is R5, the radius of curvature on the image-side surface 532 of the third lens element 530 is R6, and they satisfy the relation:

$(R5+R6)/(R5-R6)=2.20$

In the fifth embodiment of the present optical imaging lens assembly, the radius of curvature on the object-side surface 521 of the second lens element 520 is R3, the focal length of the optical imaging lens assembly is f, and they satisfy the relation:

$R3/f=-1.37$

In the fifth embodiment of the present optical imaging lens assembly, the radius of curvature on the object-side surface 531 of the third lens element 530 is R5, the focal length of the optical imaging lens assembly is f, and they satisfy the relation:

$R5/f=-0.61$

In the fifth embodiment of the present optical imaging lens assembly, the radius of curvature on the object-side surface 541 of the fourth lens element 540 is R7, the focal length of the optical imaging lens assembly is f, and they satisfy the relation:

$|R7/f|=11.34$

In the fifth embodiment of the present optical imaging lens assembly, the focal length of the third lens element 530 is f3, the focal length of the optical imaging lens assembly is f, and they satisfy the relation:

$f3/f=0.58$

In the fifth embodiment of the present optical imaging lens assembly, the focal length of the fourth lens element 540 is f4, the focal length of the optical imaging lens assembly is f, and they satisfy the relation:

$f4/f=-0.64$

In the fifth embodiment of the present optical imaging lens assembly, the focal length of the third lens element 530 is f3, the focal length of the fourth lens element 540 is f4, and they satisfy the relation:

$|f3/f4|=0.91$

In the fifth embodiment of the present optical imaging lens assembly, the distance on the optical axis between the aperture stop 500 and the electronic sensor is SL, the distance on the optical axis between the object-side surface 511 of the first lens element 510 and the electronic sensor is TTL, and they satisfy the relation:

$$SL/TTL=0.98$$

In the fifth embodiment of the present optical imaging lens assembly, the distance on the optical axis between the object-side surface 511 of the first lens element 510 and the electronic sensor is TTL, half of the diagonal length of the effective pixel area of the electronic sensor is ImgH, and they satisfy the relation:

$$TTL/ImgH=1.94$$

The detailed optical data of the fifth embodiment is shown in FIG. 15 (TABLE 9), and the aspheric surface data is shown in FIG. 16 (TABLE 10), wherein the units of the radius of curvature, the thickness and the focal length are expressed in mm, and HFOV is half of the maximal field of view.

Figure 6A:
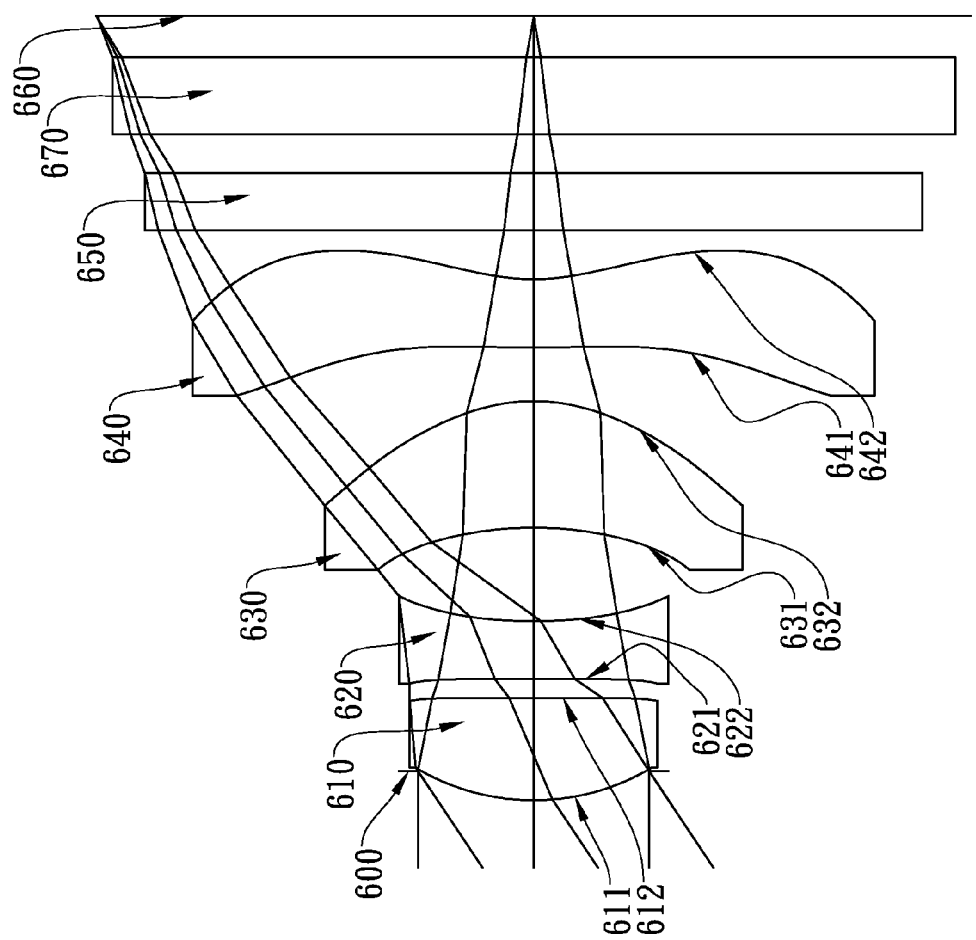
FIG. 6A shows an optical imaging lens assembly in accordance with a sixth embodiment of the present invention.
Figure 6B:
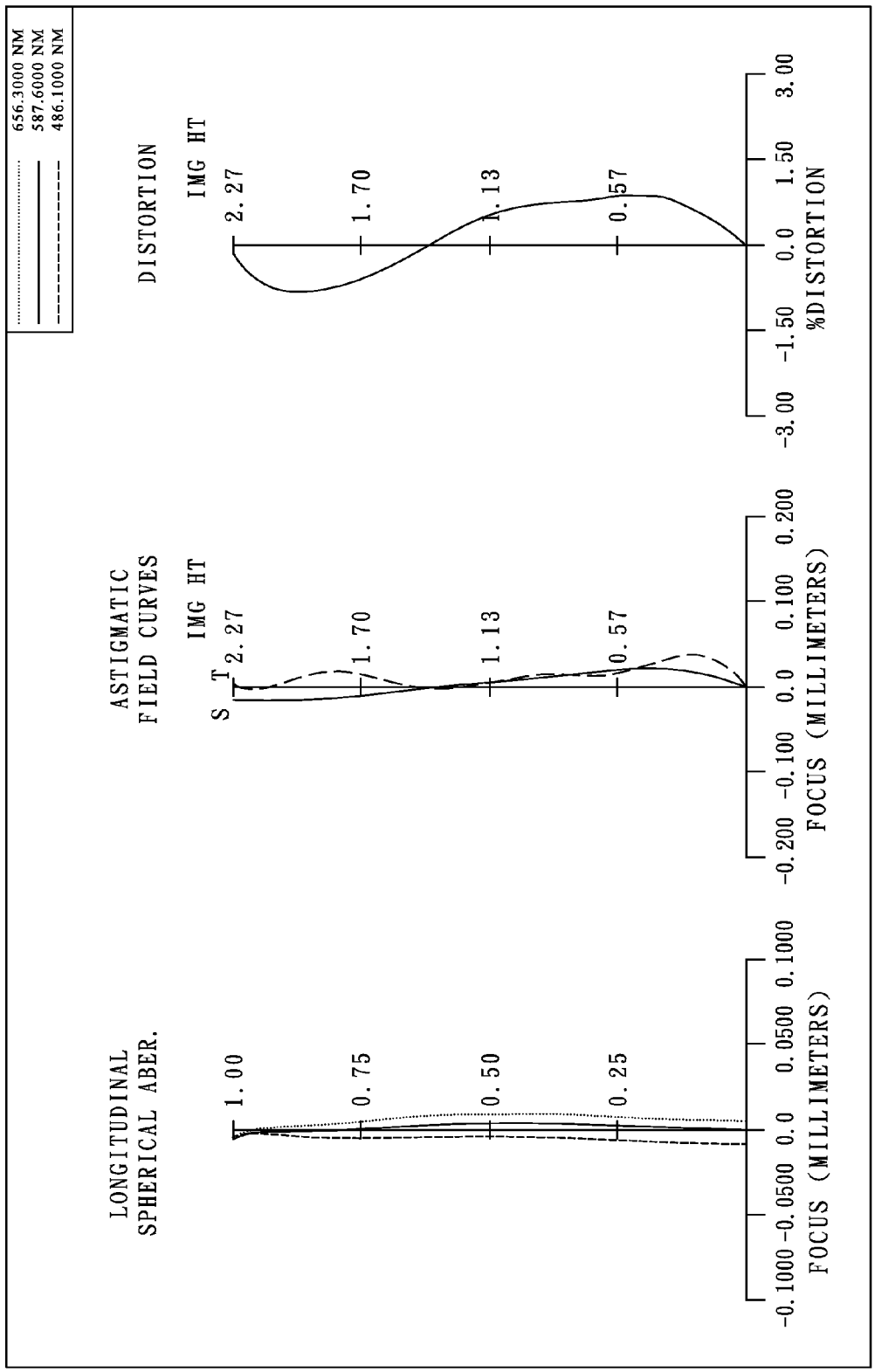
FIG. 6B shows the aberration curves of the sixth embodiment of the present invention.

FIG. 6A shows an optical imaging lens assembly in accordance with a sixth embodiment of the present invention, and FIG. 6B shows the aberration curves of the sixth embodiment of the present invention. The optical imaging lens assembly of the sixth embodiment of the present invention mainly comprises four lens elements, in order from the object side to the image side: a plastic first lens element 610 with positive refractive power having a convex object-side surface 611 and a convex image-side surface 612, the object-side and image-side surfaces 611 and 612 thereof being aspheric; a plastic second lens element 620 with negative refractive power having a concave object-side surface 621 and a concave image-side surface 622, the object-side and image-side surfaces 621 and 622 thereof being aspheric; a plastic third lens element 630 with positive refractive power having a concave object-side surface 631 and a convex image-side surface 632, the object-side and image-side surfaces 631 and 632 thereof being aspheric; and a plastic fourth lens element 640 with negative refractive power having a convex object-side surface 641 and a concave image-side surface 642, the object-side and image-side surfaces 641 and 642 thereof being aspheric, at least one inflection point on the image-side surface 642; wherein an aperture stop 600 is disposed between the imaged object and the first lens element 610; wherein an IR filter 650 is disposed between the image-side surface 642 of the fourth lens element 640 and an image plane 660; wherein a cover-glass 670 is disposed between the IR filter 650 and the image plane 660. The IR filter 650 is made of glass and has no influence on the focal length of the optical imaging lens assembly, and the optical imaging lens assembly further comprises an electronic sensor disposed at the image plane 660 for image formation.

The equation of the aspheric surface profiles of the sixth embodiment has the same form as that of the first embodiment.

In the sixth embodiment of the present optical imaging lens assembly, the focal length of the optical imaging lens assembly is f, and it satisfies the relation: f=3.42 (mm).

In the sixth embodiment of the present optical imaging lens assembly, the f-number of the optical imaging lens assembly is Fno, and it satisfies the relation: Fno=2.83.

In the sixth embodiment of the present optical imaging lens assembly, half of the maximal field of view of the optical imaging lens assembly is HFOV, and it satisfies the relation: HFOV=33.7 deg.

In the sixth embodiment of the present optical imaging lens assembly, the Abbe number of the first lens element 610 is V1, the Abbe number of the second lens element 620 is V2, and they satisfy the relation:

$$V1-V2=33.1$$

In the sixth embodiment of the present optical imaging lens assembly, the distance on the optical axis between the first lens element 610 and the second lens element 620 is T12, the focal length of the optical imaging lens assembly is f, and they satisfy the relation:

$$(T12/f)*100=2.92$$

In the sixth embodiment of the present optical imaging lens assembly, the distance on the optical axis between the object-side surface 611 of the first lens element 610 and the image-side surface 622 of the second lens element 620 is Dr1r4, the thickness on the optical axis of the third lens element 630 is CT3, and they satisfy the relation:

$$Dr1r4/CT3=1.41$$

In the sixth embodiment of the present optical imaging lens assembly, the radius of curvature of the object-side surface 611 of the first lens element 610 is R1, the focal length of the optical imaging lens assembly is f, and they satisfy the relation:

$$R1/f=0.35$$

In the sixth embodiment of the present optical imaging lens assembly, the radius of curvature on the object-side surface 611 of the first lens element 610 is R1, the radius of curvature on the image-side surface 612 of the first lens element 610 is R2, and they satisfy the relation:

$$|R1/R2|=0.01$$

In the sixth embodiment of the present optical imaging lens assembly, the radius of curvature on the object-side surface 631 of the third lens element 630 is R5, the radius of curvature on the image-side surface 632 of the third lens element 630 is R6, and they satisfy the relation:

$$(R5+R6)/(R5-R6)=2.87$$

In the sixth embodiment of the present optical imaging lens assembly, the radius of curvature on the object-side surface 621 of the second lens element 620 is R3, the focal length of the optical imaging lens assembly is f, and they satisfy the relation:

$$R3/f=-7.19$$

In the sixth embodiment of the present optical imaging lens assembly, the radius of curvature on the object-side surface 631 of the third lens element 630 is R5, the focal length of the optical imaging lens assembly is f, and they satisfy the relation:

$$R5/f=-0.57$$

In the sixth embodiment of the present optical imaging lens assembly, the radius of curvature on the object-side surface 641 of the fourth lens element 640 is R7, the focal length of the optical imaging lens assembly is f, and they satisfy the relation:

$$|R7/f|=1.60$$

In the sixth embodiment of the present optical imaging lens assembly, the focal length of the third lens element 630 is f3, the focal length of the optical imaging lens assembly is f, and they satisfy the relation:

$$f3/f=0.80$$

In the sixth embodiment of the present optical imaging lens assembly, the focal length of the fourth lens element 640 is f4, the focal length of the optical imaging lens assembly is f, and they satisfy the relation:

$$f4/f=-0.77$$

In the sixth embodiment of the present optical imaging lens assembly, the focal length of the third lens element 630 is f3, the focal length of the fourth lens element 640 is f4, and they satisfy the relation:

|f3/f4|=1.03

In the sixth embodiment of the present optical imaging lens assembly, the distance on the optical axis between the aperture stop 600 and the electronic sensor is SL, the distance on the optical axis between the object-side surface 611 of the first lens element 610 and the electronic sensor is TTL, and they satisfy the relation:

SL/TTL=0.96

In the sixth embodiment of the present optical imaging lens assembly, the distance on the optical axis between the object-side surface 611 of the first lens element 610 and the electronic sensor is TTL, half of the diagonal length of the effective pixel area of the electronic sensor is ImgH, and they satisfy the relation:

TTL/ImgH=1.70

The detailed optical data of the sixth embodiment is shown in FIG. 17 (TABLE 11), and the aspheric surface data is shown in FIG. 18 (TABLE 12), wherein the units of the radius of curvature, the thickness and the focal length are expressed in mm, and HFOV is half of the maximal field of view.

It is to be noted that TABLES 1-12 (illustrated in FIGS. 7-18 respectively) show different data of the different embodiments, however, the data of the different embodiments are obtained from experiments. Therefore, any optical imaging lens assembly of the same structure is considered to be within the scope of the present invention even if it uses different data. The embodiments depicted above and the appended drawings are exemplary and are not intended to limit the claim scope of the present invention. TABLE 13 (illustrated in FIG. 19) shows the data of the respective embodiments resulting from the equations.

What is claimed is:

1. An optical imaging lens assembly comprising, in order from an object side to an image side:
   a first lens element with positive refractive power having a convex object-side surface;
   a second lens element with negative refractive power having a concave object-side surface and a concave image-side surface;
   a third lens element with positive refractive power having a concave object-side surface and a convex image-side surface; and
   a fourth lens element with negative refractive power having a concave image-side surface, the object-side and image-side surfaces thereof being aspheric;
   wherein the optical imaging lens assembly further comprises an aperture stop disposed between an imaged object and the first lens element, and an electronic sensor at an image plane for image formation; wherein there are four lens elements with refractive power; and
   wherein a focal length of the optical imaging lens assembly is f, a focal length of the third lens element is f3, a focal length of the fourth lens element is f4, a radius of curvature on the object-side surface of the first lens element is R1, a radius of curvature on the object-side surface of the third lens element is R5, a distance on the optical axis between the object-side surface of the first lens element and the image-side surface of the second lens element is Dr1r4, a thickness on the optical axis of the third lens element is CT3, a distance on the optical axis between the aperture stop and the electronic sensor is SL, a distance on the optical axis between the object-side surface of the first lens element and the electronic sensor is TTL, and they satisfy the relation:

−0.60<R5/f<−0.20;

0.35<f3/f<0.91;

−0.83<f4/f<−0.40;

1.00<Dr1r4/CT3<1.75;

0.20<R1/f<0.41;

0.9<SL/TTL<1.1.

2. The optical imaging lens assembly according to claim 1, wherein the second lens element is made of plastic, and there is an air distance between each lens element.

3. The optical imaging lens assembly according to claim 2, wherein a radius of curvature on the object-side surface of the second lens element is R3, the focal length of the optical imaging lens assembly is f, and they satisfy the relation:

−18.0<R3/f<−2.5.

4. The optical imaging lens assembly according to claim 3, wherein the radius of curvature on the object-side surface of the third lens element is R5, the focal length of the optical imaging lens assembly is f, and they satisfy the relation:

−0.55<R5/f<−0.40.

5. The optical imaging lens assembly according to claim 1, wherein a radius of curvature on the object-side surface of the fourth lens element is R7, the focal length of the optical imaging lens assembly is f, and they satisfy the relation:

|R7/f|>1.3.

6. The optical imaging lens assembly according to claim 5, wherein the focal length of the third lens element is f3, the focal length of the optical imaging lens assembly is f, and they satisfy the relation:

0.45<f3/f<0.77.

7. The optical imaging lens assembly according to claim 6, wherein the focal length of the fourth lens element f4, the focal length of the optical imaging lens assembly is f, and they satisfy the relation:

−0.77<f4/f<−0.45.

8. The optical imaging lens assembly according to claim 1, wherein the fourth lens element has a concave object-side surface.

9. The optical imaging lens assembly according to claim 8, wherein the focal length of the third lens element is f3, the focal length of the fourth lens element is f4, and they satisfy the relation:

0.9<|f3/f4|<1.1.

10. The optical imaging lens assembly according to claim 6, wherein the radius of curvature on the object-side surface of the third lens element is R5, a radius of curvature on the image-side surface of the third lens element is R6, and they satisfy the relation:

2.25<(R5+R6)/(R5−R6)<5.00.

11. The optical imaging lens assembly according to claim 1, wherein the distance on the optical axis between the object-side surface of the first lens element and the electronic sensor is TTL, half of the diagonal length of the effective pixel area of the electronic sensor is ImgH, and they satisfy the relation:

$TTL/ImgH<1.8$.

12. An optical imaging lens assembly comprising, in order from an object side to an image side:
a first lens element with positive refractive power having a convex object-side surface;
a second lens element with negative refractive power having a concave object-side surface and a concave image-side surface;
a third lens element with positive refractive power having a concave object-side surface and a convex image-side surface; and
a fourth lens element with negative refractive power having a concave image-side surface, the object-side and image-side surfaces thereof being aspheric; and
wherein there are four lens elements with refractive power; wherein a focal length of the optical imaging lens assembly is f, a focal length of the third lens element is f3, a focal length of the fourth lens element is f4, a radius of curvature on the object-side surface of the second lens element is R3, a radius of curvature on the object-side surface of the third lens element is R5, a radius of curvature on the image-side surface of the third lens element is R6, a distance on the optical axis between the first and second lens elements is T12, and they satisfy the relation:

$-18.0<R3/f<-2.5$;

$0.35<f3/f<0.91$;

$-0.83<f4/f<-0.40$;

$2.25<(R5+R6)/(R5-R6)<5.00$;

$0.5<(T12/f)*100<4.0$.

13. The optical imaging lens assembly according to claim 12, wherein the focal length of the third lens element is f3, the focal length of the optical imaging lens assembly is f, and they satisfy the relation:

$0.45<f3/f<0.77$.

14. The optical imaging lens assembly according to claim 13, wherein the optical imaging lens assembly further comprises an aperture stop and an electronic sensor, which is disposed at the image plane for image formation; wherein a distance on the optical axis between the aperture stop and the electronic sensor is SL, a distance on the optical axis between the object-side surface of the first lens element and the electronic sensor is TTL, and they satisfy the relation:

$0.9<SL/TTL<1.1$.

15. The optical imaging lens assembly according to claim 14, wherein a radius of curvature on the object-side surface of the fourth lens element is R7, the focal length of the optical imaging lens assembly is f, and they satisfy the relation:

$|R7/f|>1.3$.

16. The optical imaging lens assembly according to claim 15, wherein the focal length of the fourth lens element is f4, the focal length of the optical imaging lens assembly is f, and they satisfy the relation:

$-0.77<f4/f<-0.45$.

17. The optical imaging lens assembly according to claim 13, wherein a distance on the optical axis between the object-side surface of the first lens element and the image-side surface of the second lens element is Dr1r4, a thickness on the optical axis of the third lens element is CT3, and they satisfy the relation:

$1.00<Dr1r4/CT3<1.75$.

18. The optical imaging lens assembly according to claim 17, wherein a radius of curvature on the object-side surface of the first lens element is R1, a radius of curvature on the image-side surface of the first lens element is R2, and they satisfy the relation:

$|R1/R2|<0.15$.

19. The optical imaging lens assembly according to claim 12, wherein the focal length of the third lens element is f3, the focal length of the fourth lens element is f4, and they satisfy the relation:

$0.9<|f3/f4|<1.1$.

20. An optical imaging lens assembly comprising, in order from an object side to an image side:
a first lens element with positive refractive power having a convex object-side surface;
a second lens element with negative refractive power having a concave object-side surface and a concave image-side surface;
a third lens element with positive refractive power having a concave object-side surface and a convex image-side surface, at least one of the surfaces having at least one inflection point; and
a fourth lens element with negative refractive power having a concave image-side surface, at least one inflection point formed on the image-side surface;
wherein the optical imaging lens assembly further comprises an aperture stop disposed between an imaged object and the first lens element, and an electronic sensor disposed at an image plane for image formation; wherein there are four lens elements with refractive power; wherein a focal length of the optical imaging lens assembly is f, a focal length of the third lens element is f3, a focal length of the fourth lens element is f4, a radius of curvature on the object-side surface of the first lens element is R1, a radius of curvature on the image-side surface of the first lens element is R2, a radius of curvature on the object-side surface of the fourth lens element is R7, a distance on the optical axis between the aperture stop and the electronic sensor is SL, a distance on the optical axis between the object-side surface of the first lens element and the electronic sensor is TTL, and they satisfy the relation:

$|R1/R2|<0.15$;

$0.35<f3/f<0.91$;

$-0.83<f4/f<-0.40$;

$|R7/f|>3.0$;

$0.9<SL/TTL<1.1$.

21. The optical imaging lens assembly according to claim 20, wherein the focal length of the third lens element is f3, the focal length of the optical imaging lens assembly is f, and they satisfy the relation:

$0.45<f3/f<0.77$.

22. The optical imaging lens assembly according to claim 21, wherein Abbe number of the first lens element is V1, an Abbe number of the second lens element is V2, and they satisfy the relation:

$$31.0 < V1 - V2 < 42.0.$$

23. The optical imaging lens assembly according to claim 22, wherein a distance on the optical axis between the first and the second lens elements is T12, the focal length of the optical imaging lens assembly is f, and they satisfy the relation:

$$0.5 < (T12/f)*100 < 4.0.$$

24. The optical imaging lens assembly according to claim 22, wherein the radius of curvature on the object-side surface of the first lens element is R1, the radius of curvature on the image-side surface of the first lens element is R2, and they satisfy the relation:

$$|R1/R2| < 0.07.$$

25. The optical imaging lens assembly according to claim 22, wherein the first lens element is made of glass and the fourth lens element has a concave object-side surface.

* * * * *